US012608925B2

(12) United States Patent
Inoshita et al.

(10) Patent No.: US 12,608,925 B2
(45) Date of Patent: Apr. 21, 2026

(54) MODEL TRAINING APPARATUS, CONTROL METHOD, AND NON-TRANSITORY COMPUTER-READABLE MEDIUM

(71) Applicant: NEC Corporation, Tokyo (JP)

(72) Inventors: Tetsuo Inoshita, Tokyo (JP); Yuichi Nakatani, Tokyo (JP)

(73) Assignee: NEC CORPORATION, Tokyo (JP)

( * ) Notice: Subject to any disclaimer, the term of this patent is extended or adjusted under 35 U.S.C. 154(b) by 301 days.

(21) Appl. No.: 18/279,136

(22) PCT Filed: Sep. 10, 2021

(86) PCT No.: PCT/JP2021/033303

§ 371 (c)(1),
(2) Date: Aug. 28, 2023

(87) PCT Pub. No.: WO2023/037494

PCT Pub. Date: Mar. 16, 2023

(65) Prior Publication Data

US 2024/0135696 A1 Apr. 25, 2024
US 2024/0233355 A9 Jul. 11, 2024

(51) Int. Cl.
*G06V 10/82* (2022.01)
*G06V 10/77* (2022.01)

(52) U.S. Cl.
CPC .......... *G06V 10/82* (2022.01); *G06V 10/7715* (2022.01)

(58) Field of Classification Search
CPC .. G06V 10/82; G06V 10/7715; G06V 10/774; G06T 1/00; H04N 1/387
See application file for complete search history.

(56) References Cited

U.S. PATENT DOCUMENTS

| | | | | |
|---|---|---|---|---|
| 10,861,213 B1 * | 12/2020 | Holzer | ................... | G06T 15/00 |
| 10,956,735 B1 * | 3/2021 | Krishna | ................ | G06V 10/25 |
| 2007/0223887 A1 | 9/2007 | Kanamori et al. | | |

(Continued)

FOREIGN PATENT DOCUMENTS

| | | |
|---|---|---|
| JP | 2016-095651 A | 5/2016 |
| WO | 2007/029443 A1 | 3/2007 |
| WO | 2014/162690 A1 | 10/2014 |

OTHER PUBLICATIONS

International Search Report for PCT Application No. PCT/JP2021/033303, mailed on Nov. 22, 2021.

(Continued)

*Primary Examiner* — Qun Shen
(74) *Attorney, Agent, or Firm* — Sughrue Mion, PLLC

(57) ABSTRACT

The model training apparatus trains an image conversion model to generate, from an input image representing a scene in a first environment, an output image representing the scene in a second environment. The model training apparatus inputs a training image to the image conversion model to obtain a first feature map and an output image, input the output image to the image conversion model to obtain a second feature map, computes a patch-wise loss using the features corresponding to a positive example patch and a negative example patch extracted from the training image and a positive example patch extracted from the output image, and trains the image conversion model based on the patch-wise loss, which is extracted intensively from the region representing an object of a specific type.

9 Claims, 10 Drawing Sheets

(56) References Cited

U.S. PATENT DOCUMENTS

| | | | | |
|---|---|---|---|---|
| 2014/0254864 A1* | 9/2014 | Dalal | ................... | G06V 40/20 |
| | | | | 382/103 |
| 2016/0055627 A1 | 2/2016 | Shibata et al. | | |
| 2016/0321512 A1* | 11/2016 | Sarachan | ............... | G16H 10/40 |
| 2017/0323223 A1 | 11/2017 | Nagata et al. | | |
| 2018/0330198 A1* | 11/2018 | Harary | ................... | G06F 16/51 |
| 2018/0330504 A1* | 11/2018 | Karlinsky | ................. | G06T 7/74 |
| 2021/0366126 A1* | 11/2021 | Chen | ....................... | G06T 7/174 |
| 2022/0012865 A1* | 1/2022 | Buckler | ............... | A61B 6/5247 |
| 2022/0083807 A1* | 3/2022 | Zhang | ................... | G06N 3/084 |

OTHER PUBLICATIONS

Taesung Park et al., "Contrastive Learning for Unpaired Image-to-Image Translation", arXiv, Aug. 20, 2020, pp. 1-29, <https://arxiv.org/abs/2007.15651>.

* cited by examiner

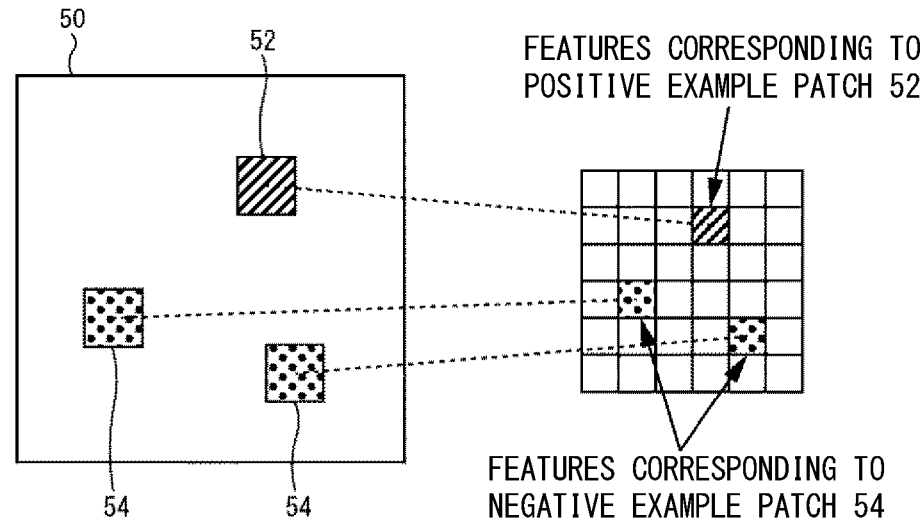
FEATURES CORRESPONDING TO
POSITIVE EXAMPLE PATCH 52
FEATURES CORRESPONDING TO
NEGATIVE EXAMPLE PATCH 54
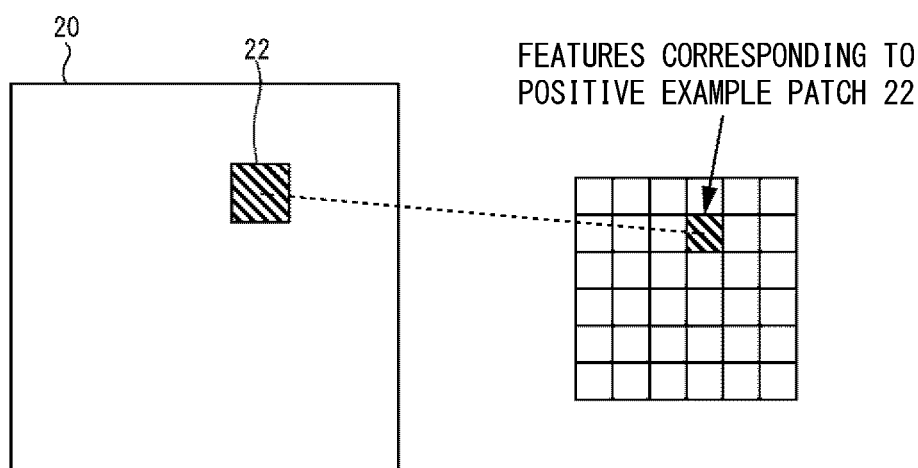
FEATURES CORRESPONDING TO
POSITIVE EXAMPLE PATCH 22
POSITIVE EXAMPLE PATCH 52 IS EXTRACTED INTENSIVELY
FROM REGION OF OBJECT OF SPECIFIC TYPE
Fig. 3 start

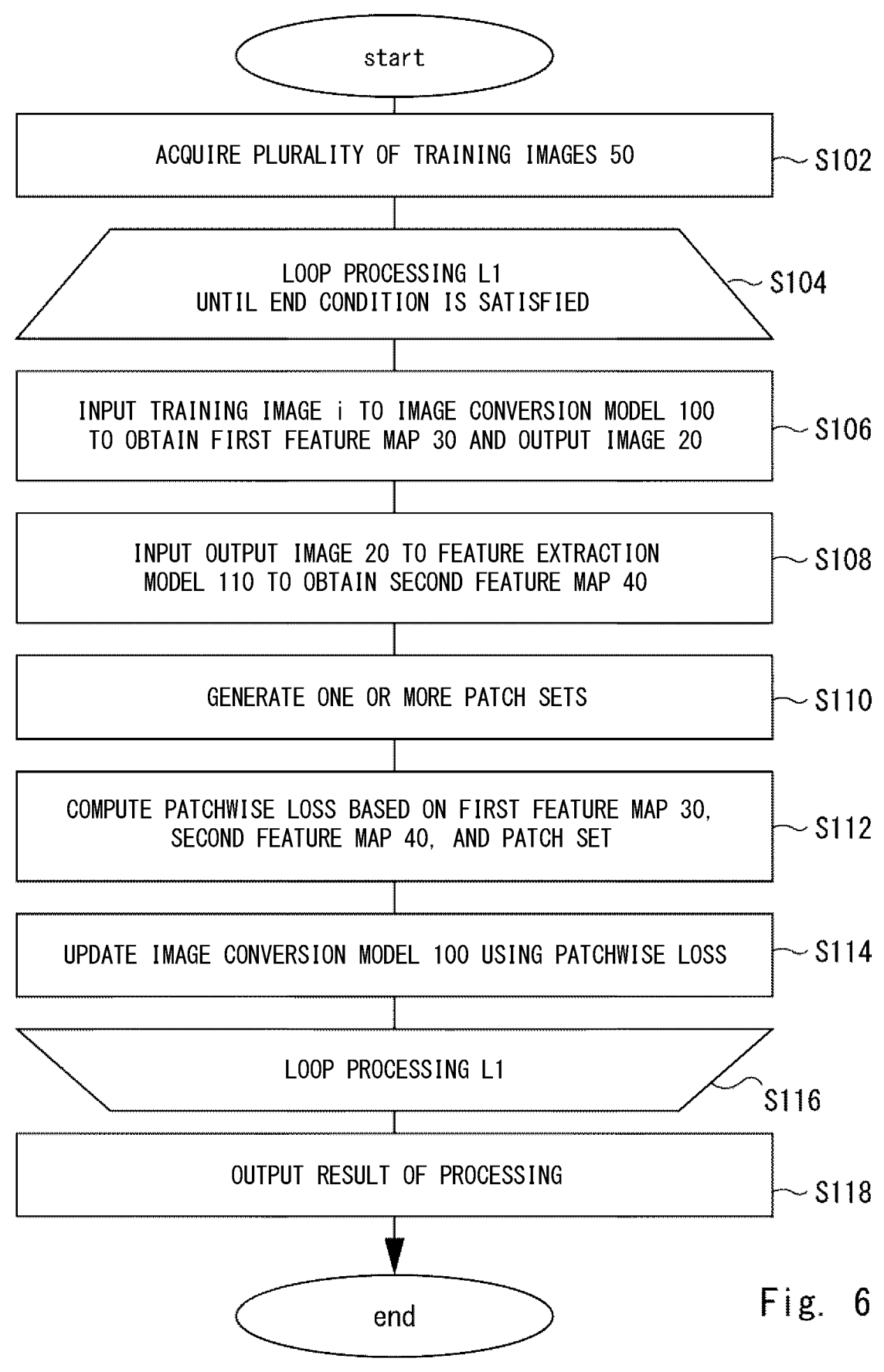

ACQUIRE PLURALITY OF TRAINING IMAGES 50 —— S102

LOOP PROCESSING L1
UNTIL END CONDITION IS SATISFIED —— S104

INPUT TRAINING IMAGE i TO IMAGE CONVERSION MODEL 100
TO OBTAIN FIRST FEATURE MAP 30 AND OUTPUT IMAGE 20 —— S106

INPUT OUTPUT IMAGE 20 TO FEATURE EXTRACTION
MODEL 110 TO OBTAIN SECOND FEATURE MAP 40 —— S108

GENERATE ONE OR MORE PATCH SETS —— S110

COMPUTE PATCHWISE LOSS BASED ON FIRST FEATURE MAP 30,
SECOND FEATURE MAP 40, AND PATCH SET —— S112

UPDATE IMAGE CONVERSION MODEL 100 USING PATCHWISE LOSS —— S114

LOOP PROCESSING L1 —— S116

OUTPUT RESULT OF PROCESSING —— S118 end

Fig. 6

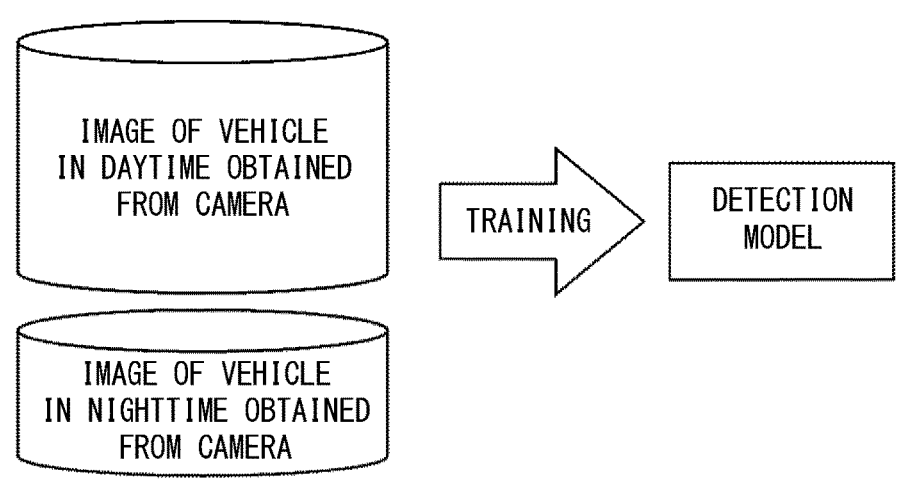
ACCURACY OF VEHICLE DETECTION IN NIGHTTIME IS LOW
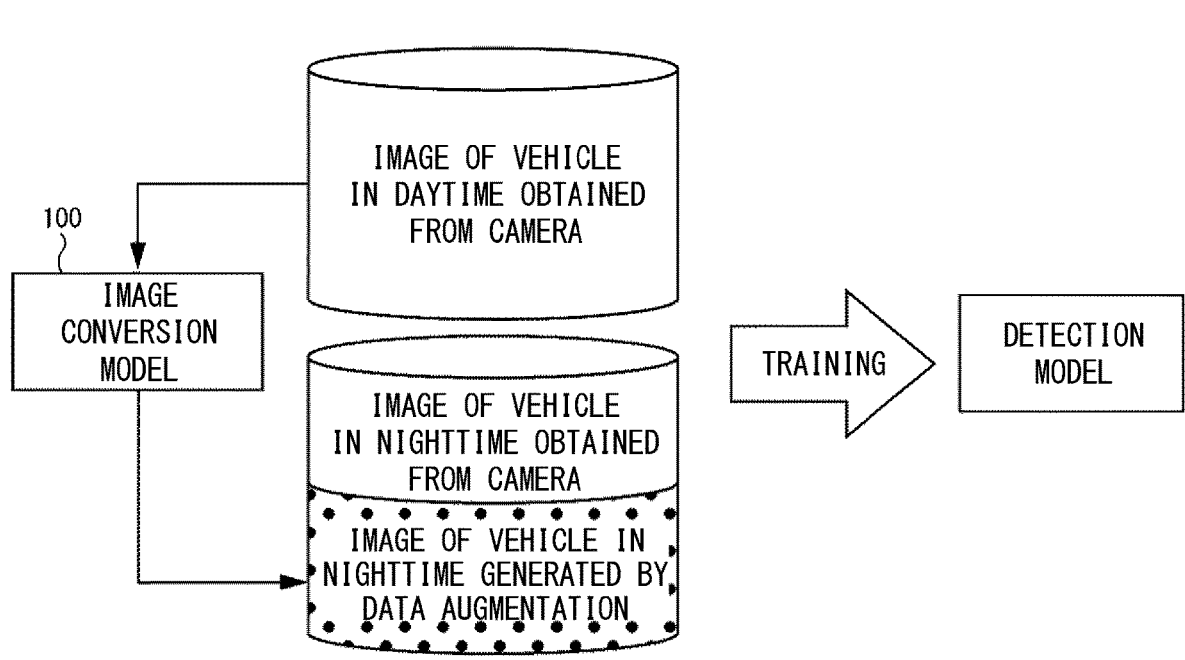
ACCURACY OF VEHICLE DETECTION IS
HIGH BOTH IN DAYTIME AND NIGHTTIME
Fig. 7

MODEL TRAINING APPARATUS, CONTROL METHOD, AND NON-TRANSITORY COMPUTER-READABLE MEDIUM

This application is a National Stage Entry of PCT/JP2021/033303 filed on Sep. 10, 2021, the contents of all of which are incorporated herein by reference, in their entirety.

TECHNICAL FIELD

The present disclosure relates to a technique for training a model that performs image conversion.

BACKGROUND ART

A model for generating another image based on an input image, that is, a model for converting an image has been developed. For example, Patent Literature 1 discloses a model for converting an input image into an image of another class, such as converting an image of a horse into an image of a zebra. This model includes an encoder that extracts a feature map from an image, and a generator that generates an image from the feature map generated by the encoder. The model is trained based on the loss that is computed to be smaller as the similarity between the features extracted from the positive example region of the input image and the features extracted from the positive example region of the output image is higher and that is computed to be higher as the similarity between the features extracted from the negative example region of the input image and the features extracted from the positive example region of the output image is lower.

CITATION LIST

Non Patent Literature

Non Patent Literature 1: Taesung Park, Alexei A. Efros, Richard Zhang, Jun-Yan Zhu, "Contrastive Learning for Unpaired Image-to-Image Translation", arXiv, arXiv:2007.15651, Aug. 20, 2020

SUMMARY OF INVENTION

Technical Problem

Non Patent Literature 1 does not mention about how the training is affected by what regions of the input image are extracted as positive examples. The present disclosure has been made in view of the above problem, and an objective of the present disclosure is to provide a new technique for training models to convert images.

Solution to Problem

A first model training apparatus of the present disclosure includes: a training execution unit configured to perform a training of an image conversion model to generate, from an input image representing a scene in a first environment, an output image representing the scene in a second environment; and an acquisition unit configured to acquire a training image, which is a first image used for the training. The image conversion model comprises a feature extraction model and an image generation model, the feature extraction model being configured to generate a feature map by extracting features from each of a plurality of partial regions of the input image, the image generation model being configured to generate the output image from the feature map generated by the feature extraction model.

The training execution unit is configured to: acquire a first feature map and the output image by inputting the training image to the image conversion model, the first feature map being a feature map of the training image; acquire a second feature map by inputting the output image to the feature extraction model, the second feature map being a feature map of the output image; generate one or more patch sets, each of which is a set of a first positive example patch, a first negative example patch, and a second positive example patch, the first positive example path and the first negative example patch being partial regions of the training image, the second positive example patch being a partial region at a position corresponding to the first positive example patch in the output image; and perform a training of the image conversion model using a patch-wise loss that is computed using the first feature map, the second feature map, and the patch set.

The training execution unit is further configured to extract the first positive example patch intensively from a specific region representing an object of a specific type among regions included in the training image in generating the patch set.

A first control method of the present disclosure is executed by a computer. The control method includes: a training execution step of performing a of training an image conversion model to generate, from an input image representing a scene in a first environment, an output image representing the scene in a second environment; and an acquisition step of acquiring a training image, which is a first image used for the training.

The image conversion model comprises a feature extraction model and an image generation model, the feature extraction model being configured to generate a feature map by extracting features from each of a plurality of partial regions of the input image, the image generation model being configured to generate the output image from the feature map generated by the feature extraction model.

The training execution step comprising: acquiring a first feature map and the output image by inputting the training image to the image conversion model, the first feature map being a feature map of the training image; acquiring a second feature map by inputting the output image to the feature extraction model, the second feature map being a feature map of the output image; generating one or more patch sets, each of which is a set of a first positive example patch, a first negative example patch, and a second positive example patch, the first positive example patch and the first negative example patch being partial regions of the training image, the second positive example patch being a partial region at a position corresponding to the first positive example patch in the output image; and performing a training of the image conversion model using a patch-wise loss that is computed using the first feature map, the second feature map, and the patch set.

In the training execution step, extracting the first positive example patch intensively from a specific region representing an object of a specific type among regions included in the training image in generating the patch set.

A first computer-readable medium of the present disclosure stores a program for causing a computer to execute the first control method of the present disclosure.

A second model training apparatus of the present disclosure includes: a training execution step of performing a training of an image conversion model to generate, from an input image representing a scene in a first environment, an output image representing the scene in a second environment; and an acquisition step of acquiring a training image, which is a first image used for the training.

The image conversion model comprises a feature extraction model and an image generation model, the feature extraction model being configured to generate a feature map by extracting features from each of a plurality of partial regions of the input image, the image generation model being configured to generate the output image from the feature map generated by the feature extraction model.

The training execution step comprising: acquiring a first feature map and the output image by inputting the training image to the image conversion model, the first feature map being a feature map of the training image; acquiring a second feature map by inputting the output image to the feature extraction model, the second feature map being a feature map of the output image; generating one or more patch sets, each of which is a set of a first positive example patch, a first negative example patch, and a second positive example patch, the first positive example path and the first negative example patch being partial regions of the training image, the second positive example patch being a partial region at a position corresponding to the first positive example patch in the output image; and performing a training of the image conversion model using a patch-wise loss that is computed using the first feature map, the second feature map, and the patch set.

In the training execution step, extracting the first positive example patch intensively from a specific region representing an object of a specific type among regions included in the training image in generating the patch set.

A second control method of the present disclosure is executed by a computer. The control method includes: a training execution unit configured to perform a training of an image conversion model to generate, from an input image representing a scene in a first environment, an output image representing the scene in a second environment; and an acquisition unit configured to acquire a training image, which is a first image used for the training.

The image conversion model includes a feature extraction model and an image generation model, the feature extraction model being configured to generate a feature map by extracting features from each of a plurality of partial regions of the input image, the image generation model being configured to generate the output image from the feature map generated by the feature extraction model.

The training execution unit is configured to: acquire a first feature map and the output image by inputting the training image to the image conversion model, the first feature map being a feature map of the training image; acquire a second feature map by inputting the output image to the feature extraction model, the second feature map being a feature map of the output image; extract a plurality of patch sets, each of which is a set of a first positive example patch, a first negative example patch, and a second positive example patch, the first positive example patch and the first negative example patch being partial regions of the training image, the second positive example patch being a partial region at a position corresponding to the first positive example patch in the output image; compute a loss for each patch set so as to be smaller as similarity between features corresponding to the first positive example patch indicated by the first feature map and features corresponding to the second positive example patch indicated by the second feature map is higher, and so as to be greater as similarity between features corresponding to the first negative example patch indicated by the first feature map and the features corresponding to the second positive example patch indicated by the second feature map is lower; compute a patch-wise loss using the loss computed for each patch set so that an impact of the loss computed for the patch set including the first positive example patch extracted from inside a specific region representing an object of a specific type is greater than an impact of the loss computed for the patch set including the first positive example patch extracted from outside the specific region; and perform a training of the image conversion model using the patch-wise loss.

A second computer-readable medium of the present disclosure stores a program for causing a computer to execute the second control method of the present disclosure.

Advantageous Effects of Invention

According to the present disclosure, a new technique for training models to convert images is provided.

BRIEF DESCRIPTION OF DRAWINGS

FIG. 3 is a diagram illustrating an overview of patch-wise loss.

FIG. 6 is a flowchart illustrating a flow of processing executed by a model training apparatus.

FIG. 7 is a diagram illustrating an effect of data augmentation using an image conversion model.

EXAMPLE EMBODIMENT

Figure 1:
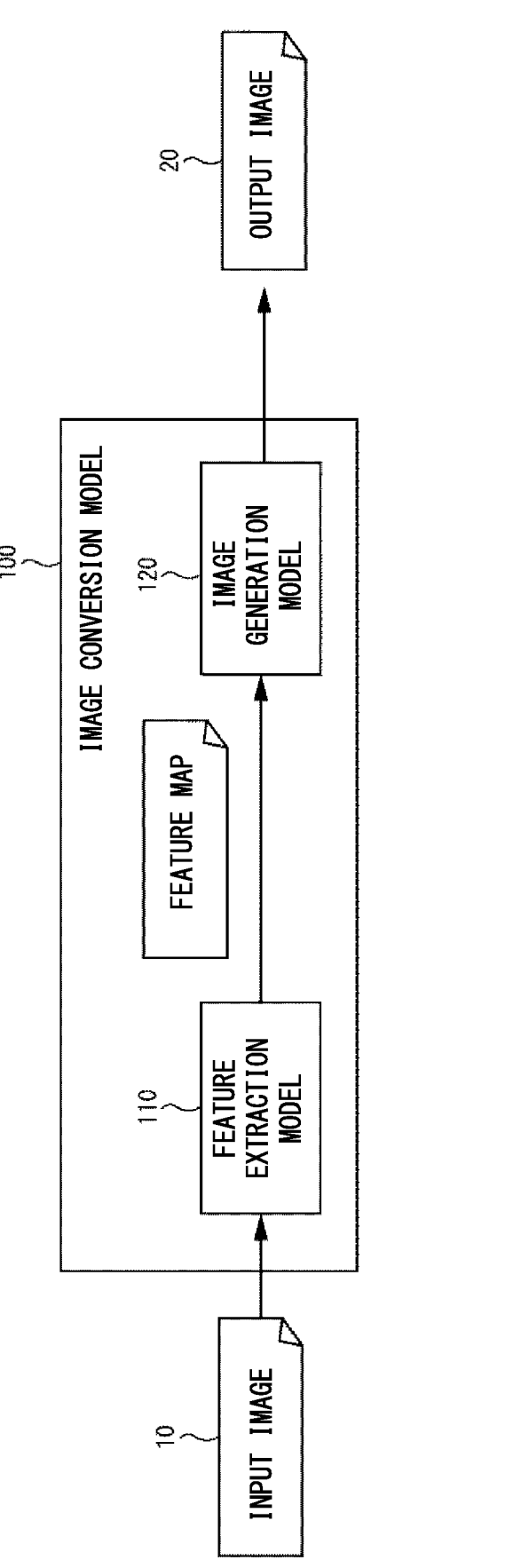
FIG. 1 is a diagram illustrating the structure of an image conversion model trained by a model training apparatus.

Hereinafter, example embodiments of the present disclosure will be described in detail with reference to the drawings. In the drawings, the same or corresponding elements are denoted by the same reference numerals, and repeated description is omitted as necessary for clarity of description. In addition, unless otherwise described, predetermined values such as predetermined values and threshold values are stored in advance in a storage device or the like accessible from a device using the values. Furthermore, unless otherwise described, the storage unit includes one or more storage devices of any number.

First Example Embodiment

Overview

FIG. 1 is a diagram illustrating the structure of an image conversion model 100 trained by a model training apparatus of a first example embodiment. The image conversion model 100 outputs an output image 20 in response to the input of an input image 10. The input image 10 is an image that is input to the image conversion model 100. The output image 20 is an image that is output from the image conversion model 100.

The image conversion model 100 is trained to perform the following processing: "When an image representing a scene in a first environment is input as the input image 10, an image representing the scene in a second environment is output as the output image 20, wherein the second environment is different from the first environment". As a result, the image conversion model 100 can artificially generate, from an image of a scene captured in one particular environment, an image of the scene captured in a different environment.

For example, it is assumed that the first environment is daytime and the second environment is nighttime. It is also assumed that the input image 10 is an image obtained by capturing a specific road by a camera. Nighttime roads are different from daytime roads in that they are generally darker, various lights such as vehicle lights and street lights are on, and the places illuminated by the lights are brighter than other places. The image conversion model 100 generates, from an image of a daytime road, an image of a nighttime road so as to artificially reproduce the features of that road in the nighttime. As a result, for example, data augmentation can be realized as described later.

Note that the environment is not limited to a time zone such as daytime or nighttime. For example, another example of the environment includes an environment related to weather. For example, it is assumed that the first environment is sunny and the second environment is rainy. In this case, the image conversion model 100 generates, from the input image 10 representing a scene in sunny weather, the output image 20 representing the scene in rainy weather. Instead of rain, other weather such as snow may be employed.

The image conversion model 100 includes two models: a feature extraction model 110 and an image generation model 120. The feature extraction model 110 is a model that is trained to extract a feature map from input images. Here, the feature map extracted from the image is a set of features obtained from each of a plurality of partial regions included in the image. The image generation model 120 is a model that is trained to generate the output image 20 from the feature map.

Both the feature extraction model 110 and the image generation model 120 are configured as any type of machine learning-based model. For example, both the feature extraction model 110 and the image generation model 120 include neural networks.

Figure 2:
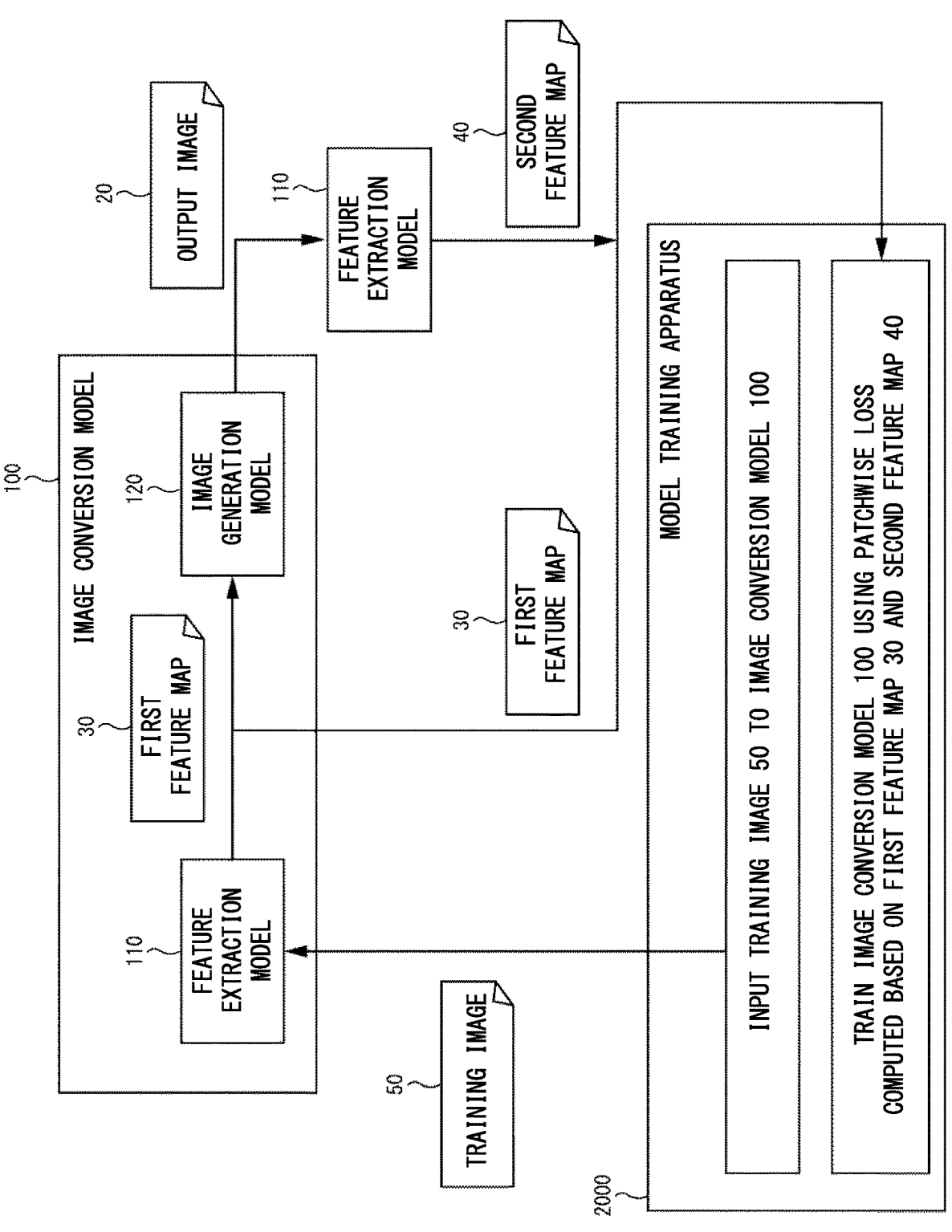
FIG. 2 is a diagram illustrating an overview of an operation of the model training apparatus.

FIG. 2 is a diagram illustrating an overview of an operation of a model training apparatus 2000 of the first example embodiment. Here, FIG. 2 is a diagram for facilitating understanding of the overview of the model training apparatus 2000, and the operation of the model training apparatus 2000 is not limited to that illustrated in FIG. 2.

In order to train the image conversion model 100, the model training apparatus 2000 acquires a plurality of training images 50 that represent scenes captured under the first environment. The model training apparatus 2000 performs the following processing using each of the training images 50. First, the model training apparatus 2000 inputs the training image 50 to the image conversion model 100 to obtain the first feature map 30, which is the feature map of the training image 50, and the output image 20. Furthermore, the model training apparatus 2000 inputs the output image 20 to the feature extraction model 110 to obtain the second feature map 40, which is a feature map of the output image

20. The model training apparatus 2000 computes a loss using the first feature map 30 and the second feature map 40, and trains the image conversion model 100 using the computed loss. Hereinafter, the loss computed using the first feature map 30 and the second feature map 40 is referred to as patch-wise loss. As will be described later, in addition to the patch-wise loss, other losses may be used for the training the image conversion model 100.

The overview of the patch-wise loss will be described with reference to FIG. 3. FIG. 3 is a diagram illustrating an overview of patch-wise loss. The model training apparatus 2000 extracts a positive example patch 52 and a negative example patch 54 from the training image 50. Both the positive example patch 52 and the negative example patch 54 are image regions that are part of the training image 50. In addition, the model training apparatus 2000 extracts a positive example patch 22 for the output image 20. The positive example patch 22 is a region that represents the same place as the place represented by the positive example patch 52 among partial image regions of the output image 20. Hereinafter, a combination of the positive example patch 52, the negative example patch 54, and the positive example patch 22 is referred to as a patch set. The model training apparatus 2000 generates one or more patch sets.

Here, between the image that is input to the image conversion model 100 and the image that is output from the image conversion model 100, although the conversion from the scene in the first environment to the scene in the second environment has been performed, the degree of similarity between the image regions that are supposed to represent the same place as each other in these images should be greater than the degree of similarity between the regions that are supposed to represent different places from each other. Therefore, the model training apparatus 2000 decreases the magnitude of the patch-wise loss as the similarity between the features corresponding to the positive example patch 52 among the features included in the first feature map 30 and the features corresponding to the positive example patch 22 among the features included in the second feature map 40 is higher. In addition, the model training apparatus 2000 increases the magnitude of the patch-wise loss as the similarity between the features corresponding to the negative example patch 54 among the features included in the first feature map 30 and the features corresponding to the positive example patch 22 among the features included in the second feature map 40 is higher.

Here, the model training apparatus 2000 extracts the positive example patch 52 intensively from the partial region representing an object of a specific type (hereinafter referred to as the specific region) of the image regions of the training image 50. The term "intensively" as used herein means that the number of cases in which the positive example patch 52 is extracted from the specific region is greater than the number of cases in which the positive example patch 52 is extracted from other partial regions. Therefore, for example, the positive example patch 52 is extracted so that the probability of the positive example patch 52 being extracted from the specific region is higher than the probability of the positive example patch 52 being extracted from other partial regions.

By extracting the positive example patch 52 intensively from the specific region in this manner, the feature extraction model 110 can be trained so that the feature of the object of the specific type is extracted with particularly high accuracy among the features of the scene represented by the input image 10. Therefore, the image conversion model 100 can be trained so that the conversion of the feature of interest is performed with particularly high accuracy.

For example, as described above, it is assumed that the image conversion model 100 is trained to generate, from the input image 10 representing a scene of the daytime road, the output image 20 representing that scene of the nighttime road. Then, it is assumed that the objects to be particularly focused on in the input image 10 and the output image 20 are vehicles. In this case, when extracting the positive example patch 52 from the training image 50, the model training apparatus 2000 extracts the positive example patch 52 intensively from the partial region representing the vehicles among the image regions included in the training image 50. As a result, the feature extraction model 110 is trained such that the features of the vehicles are extracted with particularly high accuracy from the scene represented by the input image 10. Therefore, the image conversion model 100 can be trained so that the processing of the image conversion model 100 of converting an image representing a scene of a road in the daytime into an image representing that scene in the nighttime can convert the vehicles in the daytime to the vehicles in the nighttime with particularly high accuracy. This enables to obtain the image conversion model 100 that can convert vehicles in the daytime to the vehicles in the nighttime with high accuracy.

Hereinafter, the model training apparatus 2000 of the present example embodiment will be described in more detail.

<Example of Functional Configuration>

Figure 4:
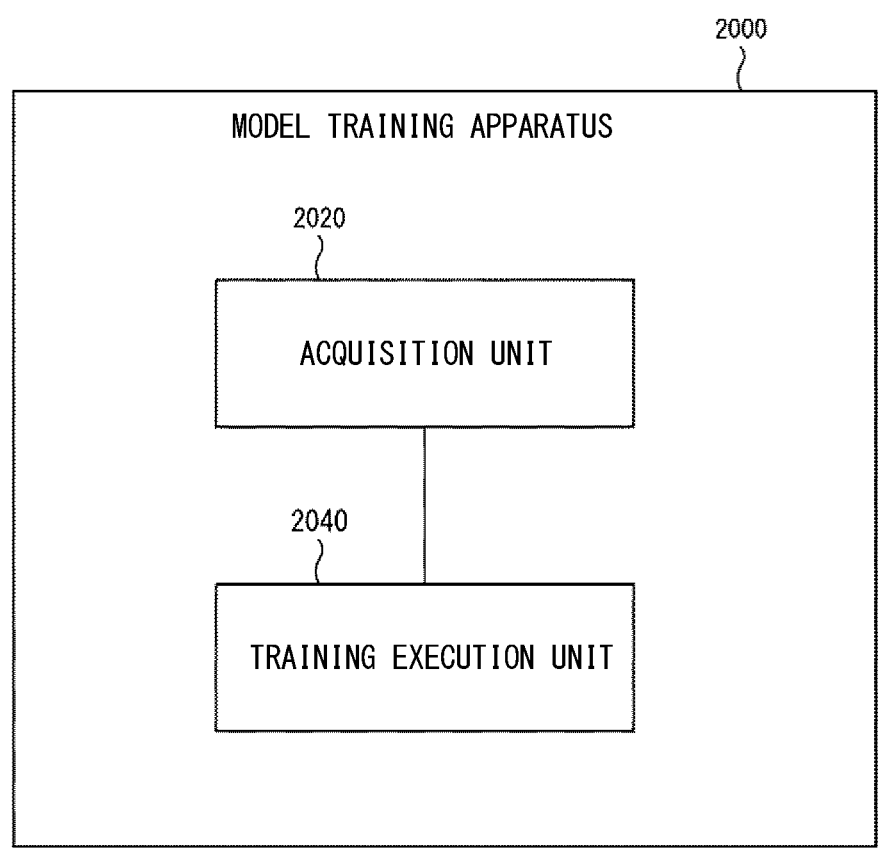
FIG. 4 is a block diagram illustrating a functional configuration of a model training apparatus.

FIG. 4 is a block diagram illustrating a functional configuration of the model training apparatus 2000 of the first example embodiment. The model training apparatus 2000 includes an acquisition unit 2020 and a training execution unit 2040. The acquisition unit 2020 acquires a plurality of training images 50. The training execution unit 2040 trains the image conversion model 100 using the training image 50. Specifically, the training execution unit 2040 inputs the training image 50 to the image conversion model 100 to obtain the first feature map and the output image 20. Furthermore, the training execution unit 2040 inputs the output image 20 to the feature extraction model 110 to obtain the second feature map 40. The training execution unit 2040 computes a patch-wise loss using the first feature map 30 and the second feature map 40, and updates the parameters of the image conversion model 100 using the patch-wise loss.

Here, the training execution unit 2040 extracts the positive example patch 52 and the negative example patch 54 from the training image 50. In addition, the training execution unit 2040 extracts the positive example patch 22 from the output image 20. The positive example patch 52 is extracted intensively from the specific region representing an object of a specific type among the partial regions included in the training image 50.

The patch-wise loss is computed so that the magnitude thereof is smaller as the similarity between the features corresponding to the positive example patch 52 among the features included in the first feature map 30 and the features corresponding to the positive example patch 22 among the features included in the second feature map 40 is higher. In addition, the patch-wise loss is computed so that the magnitude thereof is greater as the similarity between the features corresponding to the negative example patch 54 among the features included in the first feature map 30 and the features corresponding to the positive example patch 22 among the features included in the second feature map 40 is lower.

<Example of Hardware Configuration>

Each functional component of the model training apparatus 2000 may be realized by hardware (for example, a hard-wired electronic circuit or the like) that realizes each functional configuration unit, or may be realized by a combination of hardware and software (for example, a combination of an electronic circuit and a program that controls the electronic circuit or the like). Hereinafter, a case where each functional component of the model training apparatus 2000 is realized by a combination of hardware and software will be further described.

Figure 5:
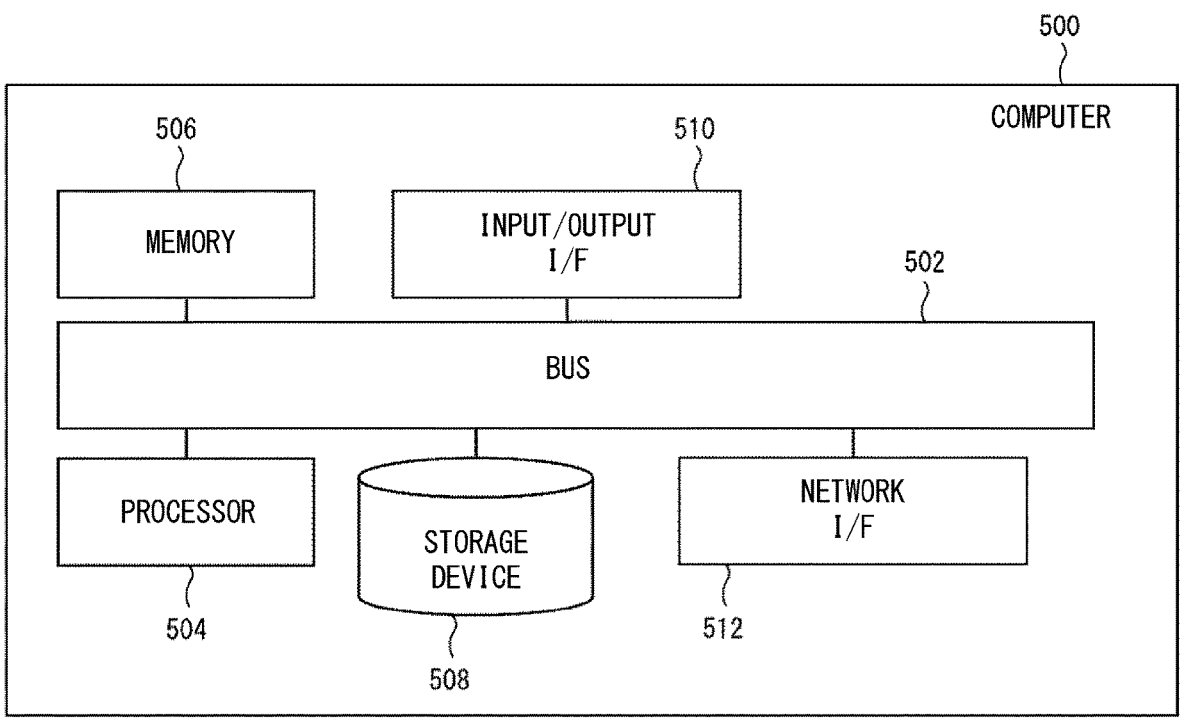
FIG. 5 is a block diagram illustrating a hardware configuration of a computer that realizes a model training apparatus.

FIG. 5 is a block diagram illustrating a hardware configuration of a computer 500 that realizes the model training apparatus 2000. The computer 500 is any computer. For example, the computer 500 is a stationary computer such as a personal computer (PC) or a server machine. In another example, the computer 500 is a portable computer such as a smartphone or a tablet terminal. The computer 500 may be a special purpose computer designed to realize the model training apparatus 2000, or may be a general-purpose computer.

For example, by installing a predetermined application in the computer 500, each function of the model training apparatus 2000 is realized in the computer 500. The above-described application is configured by a program for realizing the functional components of the model training apparatus 2000. Note that the method of acquiring the program is arbitrary. For example, the program can be acquired from a storage medium (a DVD disk, a USB memory, or the like) in which the program is stored. The program can also be acquired, for example, by downloading the program from a server device that manages the storage device in which the program is stored.

The computer 500 includes a bus 502, a processor 504, a memory 506, a storage device 508, an input/output interface 510, and a network interface 512. The bus 502 is a data transmission path for the processor 504, the memory 506, the storage device 508, the input/output interface 510, and the network interface 512 to transmit and receive data to and from each other. However, the method of connecting the processor 504 and the like to each other is not limited to the bus connection.

The processor 504 is any of processors such as a central processing unit (CPU), a graphics processing unit (GPU), or a field-programmable gate array (FPGA). The memory 506 is a primary storage device realized by using a random access memory (RAM) or the like. The storage device 508 is a secondary storage device realized by using a hard disk, a solid state drive (SSD), a memory card, read only memory (ROM), or the like.

The input/output interface 510 is an interface connecting the computer 500 and an input/output device. For example, an input device such as a keyboard and an output device such as a display device are connected to the input/output interface 510.

The network interface 512 is an interface connecting the computer 500 to a network. The network may be a local area network (LAN) or a wide area network (WAN).

The storage device 508 stores a program (program for realizing the above-described application) for realizing each functional component of the model training apparatus 2000. The processor 504 loads the program onto the memory 506 and executes the program to realize each functional component of the model training apparatus 2000.

The model training apparatus 2000 may be realized by one computer 500 or may be realized by a plurality of computers 500. In the latter case, the configurations of the computers 500 do not need to be the same, and can be different from each other.

<Flow of Processing>

FIG. 6 is a flowchart illustrating a flow of processing executed by the model training apparatus 2000 of the first example embodiment. The acquisition unit 2020 acquires a plurality of training images 50 (S102). S104 to S116 constitute loop processing L1 that is repeatedly executed until a predetermined end condition is satisfied. In S104, the training execution unit 2040 determines whether or not the end condition is satisfied. If the end condition is satisfied, the training execution unit 2040 outputs the processing result (S118). On the other hand, if the end condition is not satisfied, the training execution unit 2040 selects one of the training images 50 that have not been subject to the loop processing L1. The training image 50 selected here is referred to as a training image i.

The training execution unit 2040 inputs the training image i to the image conversion model 100 to obtain the first feature map 30 and the output image 20 (S106). The training execution unit 2040 inputs the output image 20 to the feature extraction model 110 to obtain the second feature map 40 (S108). The training execution unit 2040 generates one or more patch sets, which are combinations of the positive example patch 52, the negative example patch 54, and the positive example patch 22 (S110). The training execution unit 2040 computes a patch-wise loss based on the first feature map 30, the second feature map 40, and the patch set (S112). The training execution unit 2040 updates the image conversion model 100 using the patch-wise loss (S114). Since S116 is the end of the loop processing L1, the processing in FIG. 4 proceeds to S104.

Here, various conditions can be adopted as the end condition of the loop processing L1, that is, the end condition of the training of the image conversion model 100. For example, the end condition is that "the loop processing L1 is executed for all the acquired training images 50". In another example, the end condition is that "the training of the image conversion model 100 converges". Note that various existing techniques can be used as a technique for determining whether or not the training of the machine learning model has converged.

The flow of processing illustrated in FIG. 6 is an example, and the flow of processing executed by the model training apparatus 2000 is not limited to the flow illustrated in FIG. 6. For example, instead of computing the patch-wise loss for each training image 50, the patch-wise loss may be computed collectively for a plurality of the training images 50. In this case, at the beginning of the loop processing L1, a plurality of training images 50 is selected instead of one. Further, S106 to S110 are performed for each of the plurality of training images 50. Then, in S112, the patch-wise loss is computed using the first feature map 30, the second feature map 40, and the patch set obtained from each of the plurality of training images 50.

<Example Usage of Image Conversion Model 100>

In order to facilitate understanding of the usefulness of the model training apparatus 2000, a usage scenario of the image conversion model 100 is illustrated. The usage scenario described here is an example, and the use scene of the model training apparatus 2000 is not limited to the example described below.

As a usage scenario, a case is assumed in which video data obtained from a monitoring camera that captures a road is used for monitoring vehicles. The monitoring of the vehicles is performed by detecting the vehicles from each video frame of the video data using a monitoring apparatus. The monitoring apparatus has a detection model that is pre-trained to detect vehicles from images.

Here, the appearance of an object in an image (image features of the object) can vary depending on the environment in which the objects are captured. For example, vehicles captured in the daytime look different from the vehicles captured in the nighttime. In addition, vehicles captured in sunny weather looks different from the vehicles captured in rainy weather.

The detection model used for monitoring vehicles is preferably robust to such changes in the environment. That is, the detection model needs to be trained to detect vehicles from each video frame regardless of the time zone or weather. For this purpose, the detection model needs to be trained using images of roads captured in various environments as training images.

In this regard, the ease of obtaining training images can vary from environment to environment. For example, since there are fewer vehicles in the nighttime than in the daytime, fewer number of images on which vehicles on nighttime roads are captured are available from monitoring cameras than images on which vehicles on daytime roads are captured. In addition, in a place where it is often sunny, fewer number of images on which vehicles on non-sunny (e.g., rainy or snowy) roads are captured are available from monitoring cameras than images on which vehicles on sunny roads are captured. Due to the fact that the number of available images thus varies from environment to environment, if the detection model is trained using only the images available from monitoring cameras, the detection accuracy of vehicles in environments such as nighttime or rainy weather become low.

Therefore, the image conversion model 100 trained by the model training apparatus 2000 is used to perform data augmentation based on images of environments that are easy to obtain, thereby artificially generating images of environments that are difficult to obtain. For example, it is assumed that the image conversion model 100 has been pre-trained by the model training apparatus 2000 so that the image of the vehicles on the nighttime road is output as the output image 20 in response to an image of vehicles on a daytime road being input as the input image 10.

FIG. 7 is a diagram illustrating an effect of data augmentation using the image conversion model 100. The upper part of FIG. 7 illustrates a case where the detection model is trained using only the images obtained from the monitoring cameras, without data augmentation by the image conversion model 100. In this case, since the number of training images on which the vehicles in the nighttime are captured is insufficient, the accuracy of the detection of vehicles in the nighttime becomes low.

On the other hand, the lower part of FIG. 7 illustrates a case where data augmentation is performed by the image conversion model 100. The user inputs the image of vehicles on the daytime road obtained from the monitoring camera to the image conversion model 100, thereby obtaining an image that simulates the vehicles on the nighttime road. By doing so, the image of the vehicles on the nighttime road can be obtained in the equivalent number to the image of the vehicles on the daytime road. In this way, by training the detection model using the image obtained using the image conversion model 100 as the training image, a detection model that can accurately detect vehicles in the nighttime can be generated. That is, a detection model robust to changes in the environment can be generated.

<Acquisition of Training Image 50: S102>

The acquisition unit 2020 acquires a plurality of training images 50 (S102). There are various methods for the acquisition unit 2020 to acquire the training image 50. For example, the training image 50 is stored in advance in an arbitrary storage device in a manner that can be acquired from the model training apparatus 2000. In this case, the acquisition unit 2020 reads the training image 50 out of the storage device. Alternatively, for example, the acquisition unit 2020 may acquire the training image 50 by receiving the training image 50 transmitted from another device.

<Loss Computation Method: S112>

The training execution unit 2040 computes a patch-wise loss based on the first feature map 30, the second feature map 40, and the patch set. The first feature map 30 includes features for each of a plurality of regions included in the input image 10. Therefore, the training execution unit 2040 extracts the features corresponding to the positive example patch 52 and the features corresponding to the negative example patch 54 from the first feature map 30. Similarly, the second feature map 40 includes features for each of a plurality of regions included in the output image 20. Therefore, the training execution unit 2040 extracts the features corresponding to the positive example patch 22 from the second feature map 40. Then, the training execution unit 2040 computes the patch-wise loss using the features corresponding to the positive example patch 52, the features corresponding to the negative example patch 54, and the features corresponding to the positive example patch 22.

<<Method of Extracting Features>>

Figure 8:
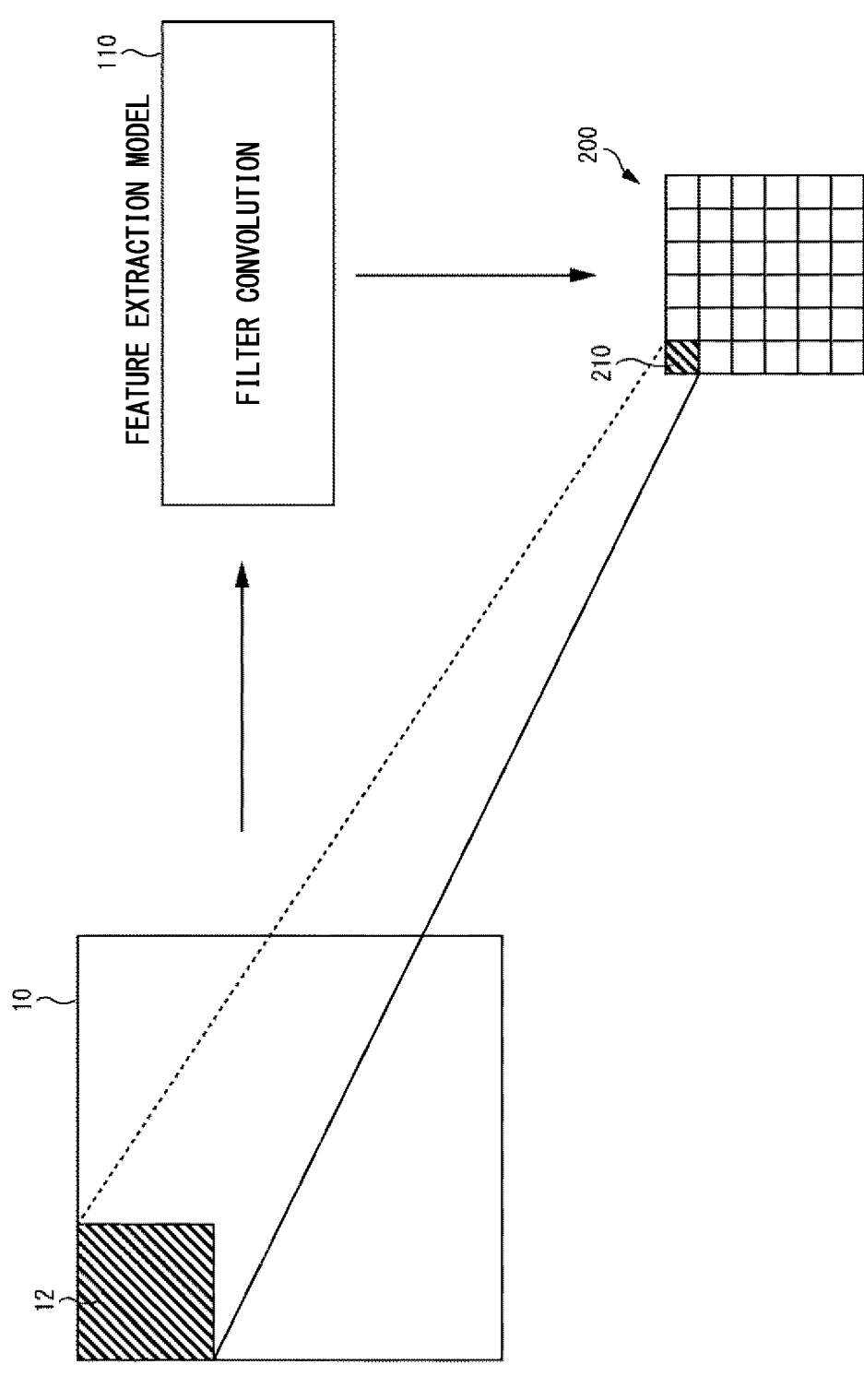
FIG. 8 is a diagram illustrating the relationship between a partial region on an image and the feature map obtained from the image.

It is possible to use an existing method as a specific method of obtaining features for a specific partial region of the input image from the feature map. This method will be briefly described below. FIG. 8 is a diagram illustrating the relationship between a partial region on an image and the feature map obtained from the image. In this example, the feature extraction model 110 is configured to perform a convolution operation of a filter on a plurality of partial regions in the input image 10.

A cell 210 of the feature map 200 indicates the features obtained by performing the convolution operation of the filter on the partial region 12 of the input image 10. Therefore, the features corresponding to the entire partial region 12 or the region inside the partial region can be obtained from the cell 210 of the feature map 200.

Suppose that, in FIG. 8, the input image 10 is the training image 50, the partial region 12 is the positive example patch 52, and the feature map 200 is the first feature map 30. In this case, the features corresponding to the positive example patch 52 can be obtained from the cell corresponding to the cell 210 in the first feature map 30.

Which cell in the first feature map 30 contains the features corresponding to the positive example patch 52 can be determined based on the position of the positive example patch 52 in the training image 50. Therefore, the training execution unit 2040 determines a cell of the first feature map 30 corresponding to the positive example patch 52, and extracts the features corresponding to the positive example patch 52 from the determined cell.

Similarly, which cell in the first feature map 30 contains the features corresponding to the negative example patch 54 can be determined based on the position of the negative example patch 54 in the training image 50. Therefore, the training execution unit 2040 determines a cell of the first feature map 30 corresponding to the negative example patch 54, and extracts the features corresponding to the negative example patch 54 from the determined cell.

Similarly, which cell in the second feature map 40 contains the features corresponding to the positive example patch 22 can be determined based on the position of the positive example patch 22 in the output image 20. Therefore, the training execution unit 2040 determines a cell of the second feature map 40 corresponding to the positive example patch 22, and extracts the features corresponding to the positive example patch 22 from the determined cell.

Note that the feature extraction model 110 may be configured to extract a plurality of types of features from each partial region of the input image 10. For example, the feature extraction model 110 is configured to perform a convolution operation for each of the plurality of filters on the input image 10. In this case, the features of each partial region of the input image 10 are obtained for each filter. Therefore, the two-dimensional map illustrated in FIG. 8 is obtained for each filter. Therefore, the training execution unit 2040 extracts the features of the positive example patch 52 and others from each map.

<<Method of Computing Patch-Wise Loss from Features>>

For each patch set, the training execution unit 2040 extracts the features corresponding to the positive example patch 52, the features corresponding to the negative example patch 54, and the features corresponding to the positive example patch 22. Then, the training execution unit 2040 computes the patch-wise loss using these features extracted for each patch set. As the patch-wise loss, patch-wise contrastive loss disclosed in Non-Patent Literature 1 can be used, for example. The following is a specific example of the method of computing the patch-wise loss.

For example, a cross entropy loss expressed by the following equation (1) is computed as the loss for one patch set:

Equation 1

$$y(v, vp, vn) = -\log\left[\frac{\exp\left(v \cdot \frac{vp}{\tau}\right)}{\exp\left(v \cdot \frac{vp}{\tau}\right) + \sum_{k=1}^{N}\exp\left(v \cdot \frac{vn_k}{\tau}\right)}\right] \quad (1)$$

where y(v,vp,vn) represents the cross-entropy loss computed for the features v, vp, and vn. v represents the features corresponding to the positive example patch 22. vp represents the features corresponding to the positive example patch 52. vn represents the set of features corresponding to the negative example patch 54. $\tau$ is a temperature parameter in softmax with temperature, and is pre-defined constant. N represents the total number of negative example patches 54. vn_k represents the features corresponding to the k-th negative example patch 54. Here, the symbol "_" represents a subscript.

In a case where there is one patch set, the patch-wise loss is computed by the above Equation (1). On the other hand, considering a case where there is a plurality of patch sets, the patch-wise loss can be generalized as in the following Equation (2).

[Equation 2]

$$\text{Loss}_{pw}(S) = \sum_{s \in S} y(v_s, vp_s, vn_s) \quad (2)$$

Here, Loss_pw(S) represents a patch-wise loss obtained using a set S of patch sets. s represents one patch set. v_s represents the features corresponding to the positive example patch 22 of the patch set s. vp_s represents the features corresponding to the positive example patch 52 of the patch set s. vn_s represents the set of features corresponding to the negative example patch 54 of the patch set s.

The feature extraction model 110 may be configured to perform multistage feature extraction. An example of such a feature extraction model 110 is a convolutional neural network having a plurality of convolution layers. In a convolutional neural network having a plurality of convolution layers, the n-th convolution layer performs a convolution operation of the (n−1)-th filter on the (n−1)th feature map output from the (n−1)-th convolution layer to output the n-th feature map (n is an integer of 2 or more).

In a case where multistage feature extraction is performed in this manner, not only the first feature map 30 and the second feature map 40, which are feature maps obtained at the end, but also feature maps obtained at intermediate stages can be used for computing the patch-wise loss. That is, the plurality of feature maps obtained from the training image 50 and the plurality of feature maps obtained from the output image 20 can be used for computing the patch-wise loss.

For example, in a case where the feature extraction model 110 is an n-layer convolutional neural network, n feature maps can be obtained by obtaining a feature map from each layer. Then, the features corresponding to the positive example patch 52, the negative example patch 54, and the positive example patch 22 can then be extracted from each of the n feature maps. Then, the training execution unit 2040 extracts the features corresponding to the positive example patch 52, the negative example patch 54, and the positive example patch 22 from each of the n feature maps, and computes a patch-wise loss using the extracted features.

In a case where the patch-wise loss is computed using a plurality of feature maps obtained from the training image 50 and the output image 20, for example, the patch-wise loss is expressed by the following equation (3).
Equation 3

Equation 3

$$\text{Loss}_{pw}(S) = \sum_{l \in L} \sum_{s \in S} y\left(v_s^l, vp_s^l, vn_s^l\right) \quad (3)$$

Here, L represents the set of layers for feature extraction and l represents a layer. v^l_s represents the features corresponding to the positive example patch 22 of the patch set s that is obtained from the feature map output from the l-th layer of the feature extraction model 110 to which the output image 20 is input. vp^l_s represents the features corresponding to the positive example patch 52 of the patch set s that is obtained from the feature map output from the l-th layer of the feature extraction model 110 to which the training image 50 is input. vn^l_s represents the set of features corresponding to the negative example patch 54 of the patch set s that is obtained from the feature map output from the l-th layer of the feature extraction model 110 to which the training image 50 is input. The symbol "^" represents a super script.

Furthermore, as described above, the patch-wise loss may be computed collectively for the plurality of training images 50. In this case, the patch-wise loss can be generalized by the following equation (4).

Equation 4

$$\text{Loss}_{pw}(S, X) = \mathbb{E}_{x \sim X} \sum_{l=1}^{L} \sum_{s \in S} y\left(v_s^l, vp_s^l, vn_s^l\right) \quad (4)$$

Figure 9:
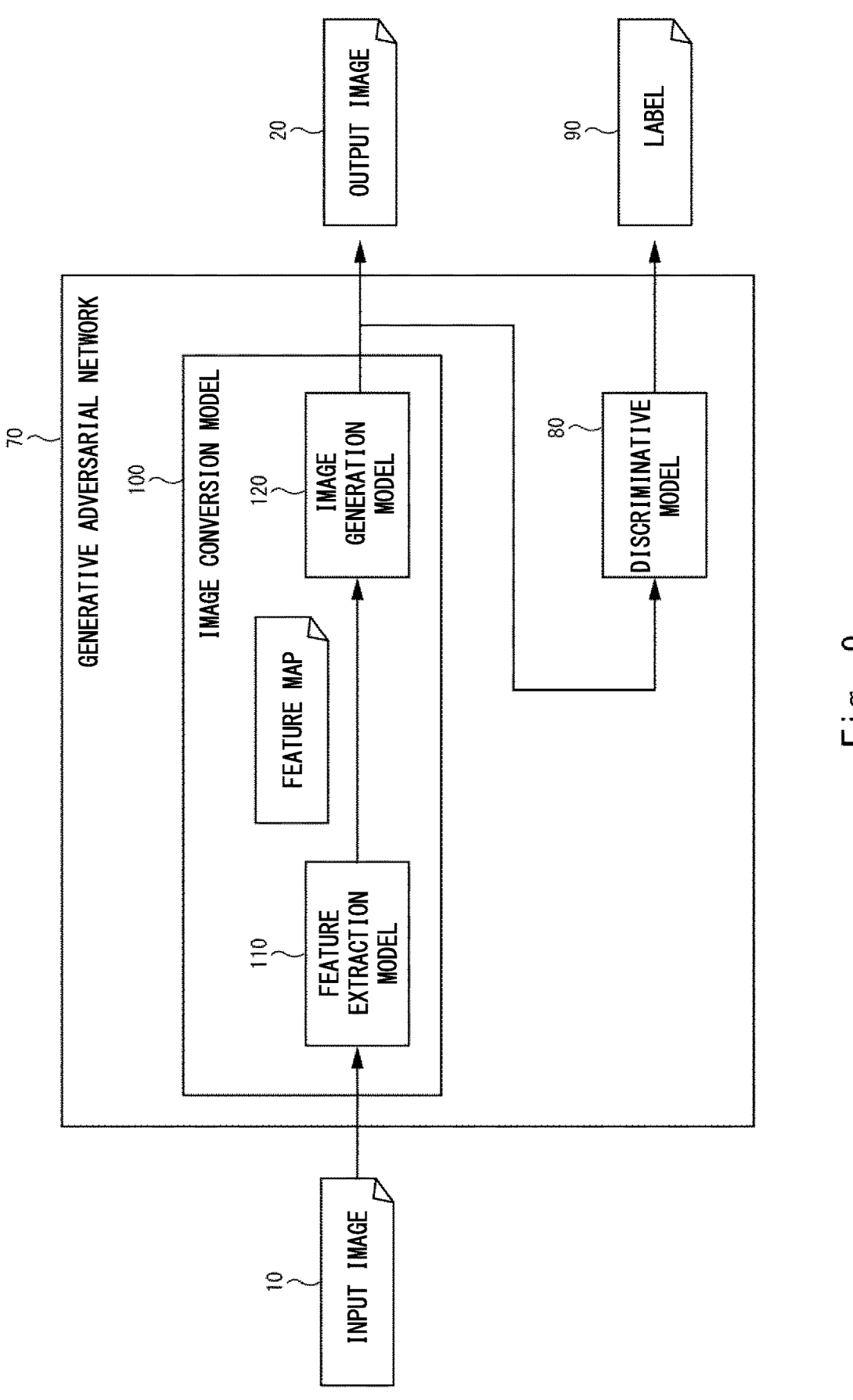
FIG. 9 is a diagram illustrating a generative adversarial network including an image conversion model and a discriminative model.

Here, X represents a set of training images 50, and x represents one training image 50 selected from the set.
<<Other Losses>>
In the raining of the image conversion model 100, it is preferable to use adversarial loss (described below) in addition to the patch-wise loss. In this case, as a premise, a Generative Adversarial Network (GAN) is configured using the image conversion model 100 and the discriminative model. FIG. 9 is a diagram illustrating a GAN including the image conversion model 100 and a discriminative model.

The GAN 70 includes an image conversion model 100 and a discriminative model 80. The discriminative model 80 is trained to output, in response to an input of an image, a label 90 indicating whether or not the image is an image generated by the image conversion model 100 (that is, the output image 20). Therefore, when an image obtained by capturing a scene in the second environment with a camera is input, the trained discriminative model 80 outputs the label 90 indicating that the image is not the output image 20. In addition, when the output image 20 generated by the image conversion model 100 is input, the trained discriminative model 80 outputs the label 90 indicating that the image is the output image 20.

The training execution unit 2040 inputs the training image 50 to the image conversion model 100 to obtain the output image 20, and then inputs the output image 20 to the discriminative model 80. Then, the training execution unit 2040 computes the adversarial loss using the label 90 obtained from the discriminative model 80. Here, existing methods can be used for a specific method of computing the adversarial loss in the GAN.

The training execution unit 2040 trains the image conversion model 100 using the patch-wise loss and the adversarial loss. For example, the training execution unit 2040 computes the sum or weighted sum of the patch-wise loss and the adversarial loss as a total loss, and uses the total loss to train the GAN 70 (the feature extraction model 110, the image generation model 120, and the discriminative model 80). Note that the total loss may further include a loss of a type other than the patch-wise loss or the adversarial loss.

The training of the model using the losses is performed by updating the parameters constituting the model based on the losses. Here, existing methods can be used for a specific method of updating the parameters of each model constituting the GAN using losses.
<Generation of Patch Set: S110>
The training execution unit 2040 generates patch sets for the training image 50 and the output image 20. As described above, one patch set includes one positive example patch 52, one or more negative example patches 54, and one positive example patch 22. For example, after performing the processing of extracting the positive example patch 52 from the training image 50, the training execution unit 2040 performs processing of extracting one or more negative example patches 54 from a region other than the positive example patch 52 in the training image 50 and processing of extracting the positive example patch 22 from the output image 20.

The positive example patch 52 is intensively extracted from the specific region, which is a partial region of the training image 50 that includes an object of a specific type.

Therefore, the training execution unit 2040 detects the specific region from the training image 50 in order to use the specific region for extraction of the positive example patch 52. Here, existing techniques can be used to detect regions representing objects of a specific type from the training image 50.

The specific type may be predetermined or may be specified by the user. In the latter case, the training execution unit 2040 acquires information indicating the specific type, and detects the region representing the specific type indicated in the information as the specific region. The information indicating the specific type is obtained as a result of user input, for example.

The following are some examples of the method of extracting the positive example patch 52 based on the detected specific region.

Method 1

First, the training execution unit 2040 determines whether to extract the positive example patch 52 from inside or outside the specific region. This determination is made so that the number of the positive example patch 52 extracted from inside the specific region is greater than the number of the positive example patch 52 extracted from outside the specific region. In this way, the positive example patch 52 is extracted intensively from the specific region.

For example, the above determination is made probabilistically. A possible way to probabilistically select one of the two options is to sample values from a Bernoulli distribution and make a determination based on the sampled values, for example. More specifically, for example, the positive example patch 52 is extracted from inside the specific region in a case where the sample value is 1, whereas the positive example patch 52 is extracted from outside the specific region in a case where the sample value is 0. In this case, by configuring the probability of the sample value being 1 to be greater than 50%, the number of the positive example patch 52 extracted from the specific region can be stochastically greater than the number of the positive example patch 52 extracted from outside the specific region.

After determining whether to extract the 52 positive example patches from inside or outside the specific region, the training execution unit 2040 extracts the positive example patch 52 based on the determination. Here, the size (hereinafter referred to as the patch size) of the positive example patch 52 is predetermined. In a case where the positive example patch 52 is extracted from the specific region, the training execution unit 2040 extracts a patch size region from any part of the specific region, and handles this region as the positive example patch 52. On the other hand, in a case where the positive example patch 52 is extracted from outside the specific region, the training execution unit 2040 selects a patch size region from any part outside the specific region, and determines the selected region as the positive example patch 52. Existing techniques can be used to arbitrarily select a region of a predetermined size from a certain region.

When the positive example patch 52 is extracted from the specific region, a part of the positive example patch 52 may be outside the specific region. For example, in this case, the positive example patch 52 is extracted so as to satisfy the condition that "a predetermined ratio or more of the positive example patch 52 is within the specific region".

Method 2

The training execution unit 2040 extracts the positive example patch 52 such that the more a region overlaps the specific region, the more the region is likely to be extracted as the positive example patch 52. Therefore, for example, the training execution unit 2040 generates an extraction probability map indicating a higher extraction probability for a higher overlap ratio with the specific region. For example, the extraction probability map is generated as a probability distribution that indicates, for each pixel in the training image 50, the probability that a patch size region whose reference point (e.g., the upper left edge of the positive example patch 52) is that pixel is extracted as the positive example patch 52. In order to increase the extraction probability with a higher overlap ratio with the specific region, the extraction probability map is generated such that, for each pixel, the higher the degree of overlap between the patch size region whose reference point is that pixel and the specific region is, the higher the extraction probability is. Note that the extraction probability map can also be said to indicate, for each partial region of the patch size in the training image 50, the probability that the partial regions are extracted as the positive example patch 52. Then, the extraction probability of each partial region is set higher as the degree of overlap between the partial region and the specific region is higher.

In order to generate such an extraction probability map, for example, first, the training execution unit 2040 sets a value for each pixel of the extraction probability map that represents the degree of overlap between the patch size region whose reference point is that pixel and the specific region. Thereafter, the training execution unit 2040 changes the value of each pixel of the extraction probability map to a value obtained by dividing the value by the sum of the values of all the pixels.

Figure 10:
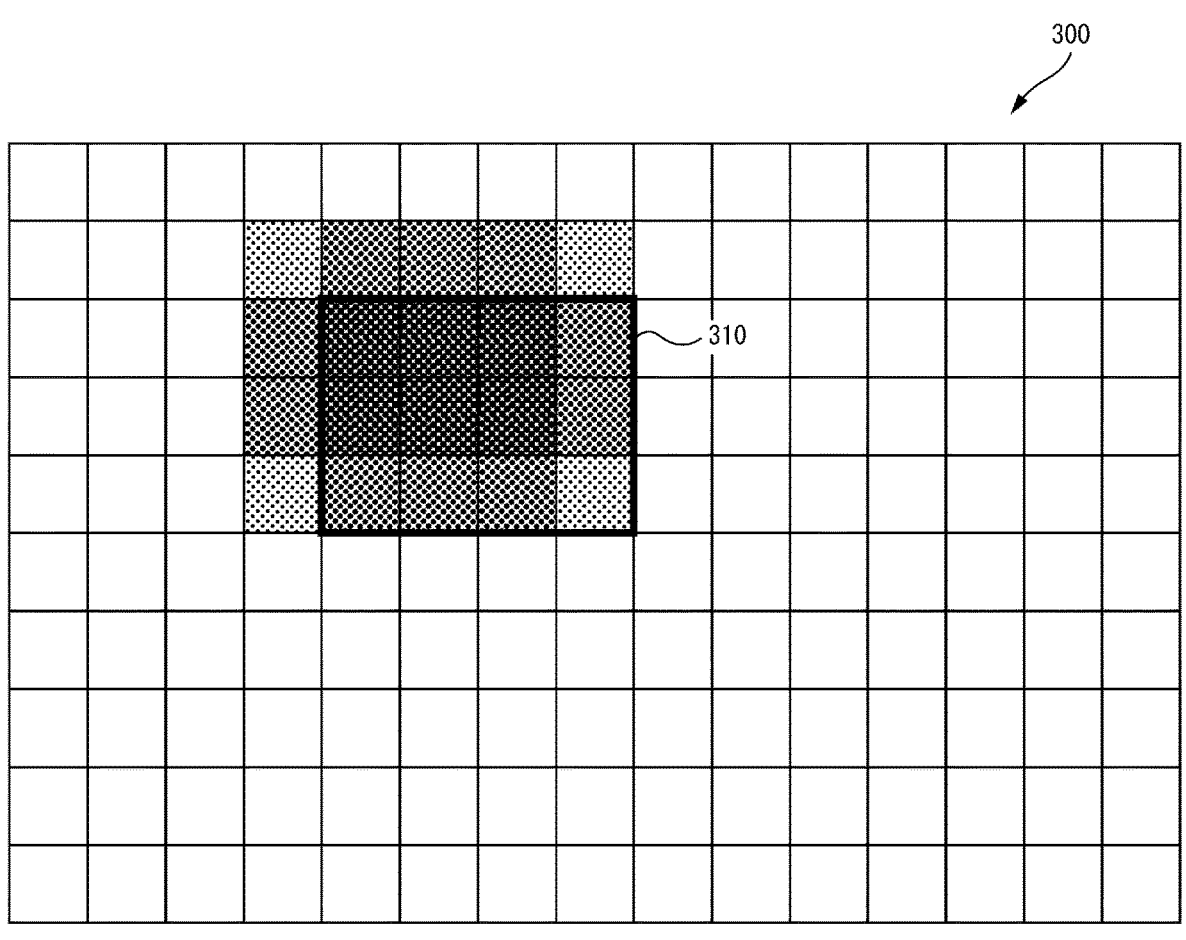
FIG. 10 is a diagram illustrating an extraction probability map.

FIG. 10 is a diagram illustrating an extraction probability map. In this example, the size of the positive example patch 52 is 282. The size of the specific region 310 is 483. Each pixel in the extraction probability map 300 indicates a higher extraction probability for a case where the positive example patch 52 is extracted with that pixel as the upper left edge, as the degree of overlap between that positive example patch 52 and the specific region is higher. Here, in FIG. 10, pixels having higher extraction probability are represented by darker dots. Therefore, in FIG. 10, the pixels represented by darker dots represent a higher probability that the positive example patch 52 is extracted with that pixel as the reference point.

The training execution unit 2040 samples the coordinates of pixels from the probability distribution represented by the extraction probability map and extracts, as the positive example patch 52, the patch size region whose reference point is the sampled coordinates.

Method 3

Objects of a specific type may be further classified into finer subcategories, and the extraction probability of each pixel in the extraction probability map described above may be determined based on the subcategories. For example, in a case where the specific type is a vehicle, the subcategory could be set to a type such as passenger car, truck, or bus. Hereinafter, the type on the subcategory to which the object included in the training image 50 belongs is referred to as a subtype.

In the case of considering subcategories, even among objects belonging to a specific type, the importance of each subtype in the training of the image conversion model 100 can vary. For example, an object of a type that appears infrequently in the training image 50 can be said to be an important object for training since it is necessary to enable the image conversion model 100 to learn its features with less training.

As a specific example, it is assumed that an image conversion model 100 is trained to generate the output image 20 representing a condition of a nighttime road from the input image 10 that is an image representing a condition of a daytime road. Here, it is assumed that trucks appear less frequently than passenger cars on the road captured to generate the training image 50. In this case, the opportunity to learn the features of truck is less than the opportunity to learn the features of passenger car. Therefore, it is necessary to enable the image conversion model 100 to learn the features of truck with less training.

Therefore, for example, a subtype is handled in the training more importantly as the frequency of appearance of that subtype is lower. More specifically, the training execution unit 2040 generates the extraction probability map such that the extraction probability is higher for specific regions that represent objects belonging to subtypes with lower frequency of appearance in the training image 50. Therefore, a higher weight is set for each subtype as it appears less frequently.

The training execution unit 2040 sets, for each pixel of the extraction probability map, a value obtained by multiplying the degree of overlap between the pixel and the specific region by a weight corresponding to the subtype of the object represented by the specific region. Then, the training execution unit 2040 changes the value of each pixel to a value obtained by dividing the value by the sum of the values of all the pixels.

The training execution unit 2040 samples the coordinates of pixels from the probability distribution represented by this extraction probability map and extracts the patch size region starting from the sampled coordinates as the positive example patch 52.

Here, the weight of each subtype may be predetermined or may be determined by the training execution unit 2040. In the latter case, for example, before extracting the positive example patch 52, the training execution unit 2040 performs processing of detecting objects of a specific type for each of the training images 50 acquired by the acquisition unit 2020, and counts the number of objects detected for each subtype. As a result, the number of appearances of each subtype in the training image group is identified. The training execution unit 2040 determines the weight of each subtype based on the number of appearances of each subtype. This weight is determined such that the weight of subtypes having a smaller number of appearances is greater.

<<Method of Extracting Negative Example Patch 54>>

The training execution unit 2040 arbitrarily (for example, randomly) extracts patch size regions from regions in the training image 50 other than the regions extracted as the positive example patch 52, and uses those regions as the negative example patches 54. As described above, one patch set may include a plurality of negative example patches 54. The number of negative example patches 54 included in one patch set should be predetermined.

<<Method of Extracting Positive Example Patch 22>>

The training execution unit 2040 extracts the positive example patch 52 from the position of the output image 20 corresponding to the position on the training image 50 from which the positive example patch 22 is extracted. That is, the same coordinates as the coordinates used as the starting point for the extraction of the positive example patch 22 are used as the coordinates of the pixel used as the starting point for the extraction of the positive example patch 52.

<Output of Processing Result: S118>

As a result of the processing, the model training apparatus 2000 outputs information with which it is possible to identify the trained image conversion model 100 (hereinafter referred to as output information). The output information includes, at least, a group of parameters of the image conversion model 100 obtained by the training. In addition to this, the output information may include a program for realizing the image conversion model 100.

A manner of outputting the output information is arbitrary. For example, the model training apparatus 2000 puts the output information in an arbitrary storage unit. In another example, the model training apparatus 2000 transmits the output information to another apparatus (for example, an apparatus that is used for operation of the image conversion model 100).

MODIFIED EXAMPLE

In the model training apparatus 2000 described above, the positive example patch 52 is extracted intensively from the specific region, so that the features of objects of the specific type are learned with particularly high accuracy. However, the method of ensuring that the features of objects of the specific type are learned with high accuracy is not limited to the method of extracting the positive example patch 52 intensively from the specific region.

For example, in addition to or instead of extracting the positive example patch 52 intensively from the specific region, the model training apparatus 2000 computes the patch-wise loss such that the impact of the loss computed using features corresponding to the positive example patch 52 extracted from the specific region (for example, the cross entropy loss described above) is greater than the impact of the loss computed using the features corresponding to the positive example patch 52 extracted from other regions. Note that, in a case where the method of extracting the positive example patch 52 intensively from the specific region is not adopted, for example, the positive example patch 52 is extracted from any part of the training image 50 with the same probability.

The method of determining the impact of the loss based on the features corresponding to the positive example patch 52, depending on whether the positive example patch 52 is extracted from inside or outside the specific region, is described below.

For example, the training execution unit 2040 computes the patch-wise loss using the following equation (5):

Equation 5

$$\text{Loss}_{pw}(S) = \sum_{s \in S} w_s * y(v_s, vp_s, vn_s) \qquad (5)$$

$$w_s =$$

$$\begin{cases} \alpha & \text{(positive example patch 52 is extracted from within specific region)} \\ \beta & \text{(positive example patch 52 is extracted from outside specific region)} \end{cases}$$

$$\text{where } \alpha > \beta > 0$$

In Equation (5), the loss computed for each patch set is multiplied by a weight $\alpha$ in a case where the positive example patch 52 in the patch set is extracted from inside the specific region, while a weight $\beta$ is multiplied in a case where the positive example patch 52 in the patch set is extracted from outside the specific region. Since $\alpha > \beta > 0$, the impact of the loss in a case where the positive example patch 52 is extracted from inside the specific region is greater than the impact of the loss in a case where the positive example patch 52 is extracted from outside the specific region.

Note that the same applies to the case of computing the patch-wise loss using the above-described equations (3) and (4). That is, in a case where feature maps are obtained from a plurality of layers of the feature extraction model 110, the weighting described above should be applied in the loss computed for the feature maps obtained from the respective layers.

However, in a case where the feature map is obtained from a plurality of layers, weights may be set for each layer based on the relationship between the size of the partial region of the input image corresponding to one cell of the feature map and the patch size, or weights may be set only for specific layers. This method will be described below.

When the feature map is obtained from a plurality of layers, the size of the partial region of the input image corresponding to one cell of the feature map is different for each feature map (for each layer). For example, it is assumed that convolution processing of a filter having a size of 3×3 is performed in each layer. In this case, one cell of the first feature map corresponds to a partial region having a size of 3×3 in the input image. In addition, one cell of the second feature map corresponds to a set of cells having a size of 3×3 in the first feature map. From this, one cell of the second feature map corresponds to a region having a size of 9×9 in the input image. For similar reasons, one cell of the third feature map corresponds to a region of size 27×27 in the input image. As described above, the feature map generated by the later layers correspond to larger partial regions of the input image.

In this regard, in the plurality of feature maps generated from different layers for the training image 50, the feature map in which the size of the partial region of the training image 50 corresponding to one cell is closer to the patch size is considered to more accurately represent the features of the positive example patch 52. The same applies to the negative example patch 54 and the positive example patch 22.

Therefore, for example, the training execution unit 2040 computes the patch-wise loss so that the closer the size of the partial region of the training image 50 corresponding to one cell is to the patch size, the greater weight is attached to the features extracted from that feature map. The same applies to the positive example patch 22 and the negative example patch 54. In this case, for example, the patch-wise loss is computed using the following Equation (6):

Equation 6

$$\text{Loss}_{pw}(S) = \sum_{l \in L}\sum_{s \in S} f(z_p, z_l) * y(v_s^l, vp_s^l, vn_s^l) \quad (6)$$

where z_p is the patch size; z_l is the size of the partial region of the input image (the training image 50 or the output image 20) corresponding to one cell of the feature map extracted from the l-th layer; f( ) is a function that outputs a larger value as the difference between zp and zl is smaller; and f( )≥0.

Note that it may be configured to attach weights only to the layer in which the size of the partial region of the input image corresponding to the cell of the feature map is closest to the patch size by attaching weights greater than 1 only to the layer 1 having the smallest difference between z_p and z_l, and attaching no weights to the other layers. Alternatively, a method of attaching weights greater than 1 to only a top predetermined number of layers in the ascending order of the difference between z_p and z_l may be adopted.

Although the present invention has been described above with reference to the example embodiments, the present invention is not limited to the above-described example embodiments. Various changes that can be understood by those skilled in the art can be made to the configuration and details of the present invention within the scope of the present invention.

In the above-described example, the program includes a group of instructions (or software code) for causing a computer to perform one or more functions described in the example embodiments when being read by the computer. The program may be stored in a non-transitory computer-readable medium or a tangible storage medium. As an example and not by way of limitation, a computer-readable medium or tangible storage medium includes a random-access memory (RAM), a read-only memory (ROM), a flash memory, a solid-state drive (SSD) or other memory technology, a CD-ROM, a digital versatile disc (DVD), a Blu-ray (registered trademark) disk or other optical disk storage, a magnetic cassette, a magnetic tape, a magnetic disk storage, or other magnetic storage devices. The program may be transmitted on a transitory computer-readable medium or a communications medium. By way of example, and not limitation, transitory computer-readable or communication media include electrical, optical, acoustic, or other forms of propagated signals.

Some or all of the above-described example embodiments may be described as in the following Supplementary Notes, but are not limited to the following Supplementary Notes.

(Supplementary Note 1)

A model training apparatus comprising:

a training execution unit configured to perform a training of an image conversion model to generate, from an input image representing a scene in a first environment, an output image representing the scene in a second environment; and an acquisition unit configured to acquire a training image, which is a first image used for the training, wherein the image conversion model comprises a feature extraction model and an image generation model, the feature extraction model being configured to generate a feature map by extracting features from each of a plurality of partial regions of the input image, the image generation model being configured to generate the output image from the feature map generated by the feature extraction model, wherein the training execution unit is configured to:

acquire a first feature map and the output image by inputting the training image to the image conversion model, the first feature map being a feature map of the training image;

acquire a second feature map by inputting the output image to the feature extraction model, the second feature map being a feature map of the output image;

generate one or more patch sets, each of which is a set of a first positive example patch, a first negative example patch, and a second positive example patch, the first positive example path and the first negative example patch being partial regions of the training image, the second positive example patch being a partial region at a position corresponding to the first positive example patch in the output image; and perform a training of the image conversion model using a patch-wise loss that is computed using the first feature map, the second feature map, and the patch set, and wherein the training execution unit is further configured to extract the first positive example patch intensively from a specific region representing an object of a specific type among regions included in the training image in generating the patch set.

(Supplementary Note 2)

The model training apparatus according to preliminary amendment 1, wherein the training execution unit is configured to extract the first positive example patch intensively from the specific region by performing the processing of determining whether to extract the first positive example patch from inside or outside the specific region so that a probability of the first positive example patch being extracted from inside the specific region is higher than a probability of the first positive example patch being extracted from outside the specific region, and extracting the first positive example patch from the training image based on a result of the determination.

(Supplementary Note 3)

The model training apparatus according to preliminary amendment 1, wherein the training execution unit is configured to extract the first positive example patch intensively from the specific region by generating an extraction probability map that represents an extraction probability for each of the plurality of partial regions of the training image, the extraction probability representing a probability that the partial region is extracted as the first positive example patch, and extracting the first positive example patch from the training image according to the extraction probability represented by the extraction probability map, and wherein the training execution unit is configured to set, for each partial region in the extraction probability map, a higher extraction probability thereto as degree of overlap between that partial region and the specific region is higher.

(Supplementary Note 4)

The model training apparatus according to preliminary amendment 3, wherein the training execution unit is configured to:

determine a subtype of the object represented by the specific region included in the training image, the subtype representing a finer classification than the specific type; and set, for each partial region in the extraction probability map, a higher extraction probability thereto as degree of overlap between that partial region and the specific region is higher and as frequency of appearance of the subtype of the object represented by the specific region overlapping with that partial region is lower.

(Supplementary Note 5)

The model training apparatus according to any one of preliminary amendments 1 to 4, wherein the training execution unit is configured to compute the patch-wise loss so as to be smaller as similarity between features corresponding to the first positive example patch and features corresponding to the second positive example patch is higher, and so as to be greater as similarity between features corresponding to the first negative example patch and the features corresponding to the second positive example patch is lower.

(Supplementary Note 6)

A training method executed by a computer, comprising:

a training execution step of performing a of training an image conversion model to generate, from an input image representing a scene in a first environment, an output image representing the scene in a second environment; and an acquisition step of acquiring a training image, which is a first image used for the training, wherein the image conversion model comprises a feature extraction model and an image generation model, the feature extraction model being configured to generate a feature map by extracting features from each of a plurality of partial regions of the input image, the image generation model being configured to generate the output image from the feature map generated by the feature extraction model, wherein the training execution step comprising:

acquiring a first feature map and the output image by inputting the training image to the image conversion model, the first feature map being a feature map of the training image;

acquiring a second feature map by inputting the output image to the feature extraction model, the second feature map being a feature map of the output image;

generating one or more patch sets, each of which is a set of a first positive example patch, a first negative example patch, and a second positive example patch, the first positive example patch and the first negative example patch being partial regions of the training image, the second positive example patch being a partial region at a position corresponding to the first positive example patch in the output image; and performing a training of the image conversion model using a patch-wise loss that is computed using the first feature map, the second feature map, and the patch set, and wherein in the training execution step, extracting the first positive example patch intensively from a specific region representing an object of a specific type among regions included in the training image in generating the patch set.

(Supplementary Note 7)

The model training method according to preliminary amendment 6, wherein in the training execution step, extracting the first positive example patch intensively from the specific region by performing the processing of determining whether to extract the first positive example patch from inside or outside the specific region so that a probability of the first positive example patch being extracted from inside the specific region is higher than a probability of the first positive example patch being extracted from outside the specific region, and extracting the first positive example patch from the training image based on the result of the determination.

(Supplementary Note 8)

The control method according to preliminary amendment 6, wherein in the training execution step, extracting the first positive example patch intensively from the specific region by generating an extraction probability map that represents an extraction probability for each of the plurality of partial regions of the training image, the extraction probability representing a probability that the partial region is extracted as the first positive example patch, and extracting the first positive example patch from the training image according to the extraction probability represented by the extraction probability map, and wherein in the training execution step, setting, for each partial region in the extraction probability map, a higher extraction probability thereto as degree of overlap between that partial region and the specific region is higher.

(Supplementary Note 9)

The control method according to preliminary amendment 8, wherein in the training execution step:

determining a subtype of the object represented by the specific region included in the training image, the subtype representing a finer classification than the specific type; and setting, for each partial region in the extraction probability map, a higher extraction probability thereto as degree of overlap between that partial region and the specific region is higher and as frequency of appearance of the subtype of the object represented by the specific region overlapping with that partial region is lower.

(Supplementary Note 10)

The training method according to any one of preliminary amendments 6 to 9, wherein in the training execution step, computing the patch-wise loss so as to be smaller as similarity between features corresponding to the first positive example patch and features corresponding to the second positive example patch is higher, and so as to be greater as similarity between features corresponding to the first negative example patch and the features corresponding to the second positive example patch is lower.

(Supplementary Note 11)

A non-transitory computer-readable medium storing a program causing a computer to execute:

a training execution step of performing a training of an image conversion model to generate, from an input image representing a scene in a first environment, an output image representing the scene in a second environment; and an acquisition step of acquiring a training image, which is a first image used for the training, wherein the image conversion model comprises a feature extraction model and an image generation model, the feature extraction model being configured to generate a feature map by extracting features from each of a plurality of partial regions of the input image, the image generation model being configured to generate the output image from the feature map generated by the feature extraction model, wherein the training execution step comprising:

acquiring a first feature map and the output image by inputting the training image to the image conversion model, the first feature map being a feature map of the training image;

acquiring a second feature map by inputting the output image to the feature extraction model, the second feature map being a feature map of the output image;

generating one or more patch sets, each of which is a set of a first positive example patch, a first negative example patch, and a second positive example patch, the first positive example path and the first negative example patch being partial regions of the training image, the second positive example patch being a partial region at a position corresponding to the first positive example patch in the output image; and performing a training of the image conversion model using a patch-wise loss that is computed using the first feature map, the second feature map, and the patch set, and wherein in the training execution step, extracting the first positive example patch intensively from a specific region representing an object of a specific type among regions included in the training image in generating the patch set.

(Supplementary Note 12)

The computer-readable medium according to preliminary amendment 11, wherein in the training execution step, extracting the first positive example patch intensively from the specific region by performing the processing of determining whether to extract the first positive example patch from inside or outside the specific region so that a probability of the first positive example patch being extracted from inside the specific region is higher than a probability of the first positive example patch being extracted from outside the specific region, and extracting the first positive example patch from the training image based on the result of the determination.

(Supplementary Note 13)

The computer-readable medium according to preliminary amendment 11, wherein in the training execution step, extracting the first positive example patch intensively from the specific region by generating an extraction probability map that represents an extraction probability for each of the plurality of partial regions of the training image, the extraction probability representing a probability that the partial region is extracted as the first positive example patch, and extracting the first positive example patch from the training image according to the extraction probability represented by the extraction probability map, and wherein in the training execution step, setting, for each partial region in the extraction probability map, a higher extraction probability thereto as degree of overlap between that partial region and the specific region is higher.

(Supplementary Note 14)

The computer-readable medium according to preliminary amendment 13, wherein in the training execution step:

determining a subtype of the object represented by the specific region included in the training image, the subtype representing a finer classification than the specific type; and setting, for each partial region in the extraction probability map, a higher extraction probability thereto as degree of overlap between that partial region and the specific region and as frequency of appearance of the subtype of the object represented by the specific region overlapping with that partial region is lower.

(Supplementary Note 15)

The computer-readable medium according to any one of preliminary amendments 11 to 14, wherein in the training execution step, computing the patch-wise loss so as to be smaller as similarity between features corresponding to the first positive example patch and features corresponding to the second positive example patch is higher, and so as to be higher as similarity between features corresponding to the first negative example patch and the features corresponding to the second positive example patch is lower.

(Supplementary Note 16)

A model training apparatus comprising:

a training execution unit configured to perform a training of an image conversion model to generate, from an input image representing a scene in a first environment, an output image representing the scene in a second environment; and an acquisition unit configured to acquire a training image, which is a first image used for the training, wherein the image conversion model includes a feature extraction model and an image generation model, the feature extraction model being configured to generate a feature map by extracting features from each of a plurality of partial regions of the input image, the image generation model being configured to generate the output image from the feature map generated by the feature extraction model, wherein the training execution unit is configured to:

acquire a first feature map and the output image by inputting the training image to the image conversion model, the first feature map being a feature map of the training image;

acquire a second feature map by inputting the output image to the feature extraction model, the second feature map being a feature map of the output image;

extract a plurality of patch sets, each of which is a set of a first positive example patch, a first negative example patch, and a second positive example patch, the first positive example patch and the first negative example patch being partial regions of the training image, the second positive example patch being a partial region at a position corresponding to the first positive example patch in the output image;

compute a loss for each patch set so as to be smaller as similarity between features corresponding to the first positive example patch indicated by the first feature map and features corresponding to the second positive example patch indicated by the second feature map is higher, and so as to be greater as similarity between features corresponding to the first negative example patch indicated by the first feature map and the features corresponding to the second positive example patch indicated by the second feature map is lower;

compute a patch-wise loss using the loss computed for each patch set so that an impact of the loss computed for the patch set including the first positive example patch extracted from inside a specific region representing an object of a specific type is greater than an impact of the loss computed for the patch set including the first positive example patch extracted from outside the specific region; and perform a training of the image conversion model using the patch-wise loss.

(Supplementary Note 17)

The model training apparatus according to preliminary amendment 16, wherein the training execution unit computes the patch-wise loss by computing a weighted sum of the losses computed for each patch set, and wherein in the weighted sum, a value greater than a weight of the loss computed for the patch set including the first positive example patch extracted from outside the specific region is set to a weight of the loss computed for the patch set including the first positive example patch extracted from inside the specific region.

(Supplementary Note 18)

The model training apparatus according to preliminary amendment 17, wherein the feature extraction model comprises a plurality of layers, wherein each of the layers generates a feature map of a smaller size than a feature map generated by a previous layer by extracting features from the feature map generated by the previous layer, wherein the training execution unit is configured to:

extract the features corresponding to the first positive example patch and the features corresponding to the first negative example patch from each of the plurality of feature maps generated by the plurality of layers of the feature extraction model to which the training image is input;

extract the features corresponding to the second positive example patch from each of the plurality of feature maps generated by the plurality of layers of the feature extraction model to which the output image is input;

compute a loss for each patch set and for each layer using the features of the first positive example patch, the first negative example patch, and the second positive example patch of that patch set extracted from the feature map generated by that layer; and compute the patch-wise loss by computing a weighted sum of the losses computed for each patch set and for each layer, and wherein in the weighted sum, the closer a size of a partial region of the input image corresponding to one cell of the feature map is to a size of the first positive example patch, the greater a weight of the loss computed using features extracted from that feature map is set to be.

(Supplementary Note 19)

The model training apparatus according to preliminary amendment 17, wherein the feature extraction model comprises a plurality of layers, wherein each of the layers generates a feature map of a smaller size than a feature map generated by a previous layer by extracting features from the feature map generated by the previous layer, wherein the training execution unit is configured to:

extract the features corresponding to the first positive example patch and the features corresponding to the first negative example patch from each of the plurality of feature maps generated by the plurality of layers of the feature extraction model to which the training image is input;

extract the features corresponding to the second positive example patch from each of the plurality of feature maps generated by the plurality of layers of the feature extraction model to which the output image is input;

compute a loss for each patch set and for each layer using the features of the first positive example patch, the first negative example patch, and the second positive example patch of that patch set extracted from the feature map generated by that layer; and compute the patch-wise loss by computing a weighted sum of the losses computed for each patch set and for each layer, and wherein in the weighted sum, for the feature map in which a size of a partial region corresponding to one cell of the feature map is closest to a size of the first positive example patch, a greater weight is set for the loss computed using the features extracted from that feature map is set to be greater than those set for other losses.

(Supplementary Note 20)

A control method executed by a computer, comprising:

a training execution step of performing a training of an image conversion model to generate, from an input image representing a scene in a first environment, an output image representing the scene in a second environment; and an acquisition step of acquiring a training image, which is a first image used for the training, wherein the image conversion model comprises a feature extraction model and an image generation model, the feature extraction model being configured to generate a feature map by extracting features from each of a plurality of partial regions of the input image, the image generation model being configured to generate the output image from the feature map generated by the feature extraction model, wherein in the training execution step:

acquiring a first feature map and the output image by inputting the training image to the image conversion model, the first feature map being a feature map of the training image;

acquiring a second feature map by inputting the output image to the feature extraction model, the second feature map being a feature map of the output image;

extracting a plurality of patch sets, each of which is a set of a first positive example patch, a first negative example patch, and a second positive example patch, the first positive example patch and the first negative example patch being partial regions of the training image, the second positive example patch being a partial region at a position corresponding to the first positive example patch in the output image;

computing a loss for each patch set so as to be smaller as similarity between features corresponding to the first positive example patch indicated by the first feature map and features corresponding to the second positive example patch indicated by the second feature map is higher, and so as to be greater as similarity between features corresponding to the first negative example patch indicated by the first feature map and the features corresponding to the second positive example patch indicated by the second feature map is lower;

computing a patch-wise loss using the loss computed for each patch set so that an impact of the loss computed for the patch set including the first positive example patch extracted from inside a specific region representing an object of a specific type is greater than an impact of the loss computed for the patch set including the first positive example patch extracted from outside the specific region; and performing a training of the image conversion model using the patch-wise loss.

(Supplementary Note 21)

The control method according to preliminary amendment 20, wherein in the training execution step, computing the patch-wise loss by computing a weighted sum of the losses computed for each patch set, and wherein in the weighted sum, a value greater than a weight of the loss computed for the patch set including the first positive example patch extracted from outside the specific region is set to a weight of the loss computed for the patch set including the first positive example patch extracted from inside the specific region.

(Supplementary Note 22)

The control method according to preliminary amendment 21, wherein the feature extraction model comprises a plurality of layers, wherein each of the layers generates a feature map of a smaller size than a feature map generated by a previous layer by extracting features from the feature map generated by the previous layer, wherein in the training execution step:

extracting the features corresponding to the first positive example patch and the features corresponding to the first negative example patch from each of the plurality of feature maps generated by the plurality of layers of the feature extraction model to which the training image is input;

extracting the features corresponding to the second positive example patch from each of the plurality of feature maps generated by the plurality of layers of the feature extraction model to which the output image is input;

computing a loss for each patch set and for each layer using the features of the first positive example patch, the first negative example patch, and the second positive example patch of that patch set extracted from the feature map generated by that layer; and computing the patch-wise loss by computing a weighted sum of the losses computed for each patch set and for each layer, and wherein in the weighted sum, the closer a size of a partial region of the input image corresponding to one cell of the feature map is to a size of the first positive example patch, the greater a weight of the loss computed using features extracted from that feature map is set to be.

(Supplementary Note 23)

The control method according to preliminary amendment 21, wherein the feature extraction model comprises a plurality of layers, wherein each of the layers generates a feature map of a smaller size than a feature map generated by a previous layer by extracting features from the feature map generated by the previous layer, wherein in the training execution step:

extracting the features corresponding to the first positive example patch and the features corresponding to the first negative example patch from each of the plurality of feature maps generated by the plurality of layers of the feature extraction model to which the training image is input;

extracting the features corresponding to the second positive example patch from each of the plurality of feature maps generated by the plurality of layers of the feature extraction model to which the output image is input;

computing a loss for each patch set and for each layer using the features of the first positive example patch, the first negative example patch, and the second positive example patch of that patch set extracted from the feature map generated by that layer; and computing the patch-wise loss by computing a weighted sum of the losses computed for each patch set and for each layer, and wherein in the weighted sum, for the feature map in which a size of a partial region corresponding to one cell of the feature map is closest to a size of the first positive example patch, a greater weight is set for the loss computed using the features extracted from that feature map is set to be greater than those set for other losses.

(Supplementary Note 24)

A non-transitory computer-readable medium storing a program causing a computer to execute:

a training execution step of performing a training of an image conversion model to generate, from an input image representing a scene in a first environment, an output image representing the scene in a second environment; and an acquisition step of acquiring a training image, which is a first image used for the training, wherein the image conversion model comprises a feature extraction model and an image generation model, the feature extraction model being configured to generate a feature map by extracting features from each of a plurality of partial regions of the input image, the image generation model being configured to generate the output image from the feature map generated by the feature extraction model, wherein in the training execution step:

acquiring a first feature map and the output image by inputting the training image to the image conversion model, the first feature map being a feature map of the training image;

acquiring a second feature map by inputting the output image to the feature extraction model, the second feature map being a feature map of the output image;

extracting a plurality of patch sets, each of which is a set of a first positive example patch, a first negative example patch, and a second positive example patch, the first positive example patch and the first negative example patch being partial regions of the training image, the second positive example patch being a partial region at a position corresponding to the first positive example patch in the output image;

computing a loss for each patch set so as to be smaller as similarity between features corresponding to the first positive example patch indicated by the first feature map and features corresponding to the second positive example patch indicated by the second feature map is higher, and so as to be greater as similarity between features corresponding to the first negative example patch indicated by the first feature map and the features corresponding to the second positive example patch indicated by the second feature map is lower;

computing a patch-wise loss using the loss computed for each patch set so that an impact of the loss computed for the patch set including the first positive example patch extracted from inside a specific region representing an object of a specific type is greater than an impact of the loss computed for the patch set including the first positive example patch extracted from outside the specific region; and performing a training of the image conversion model using the patch-wise loss.

(Supplementary Note 25)

The computer-readable medium according to preliminary amendment 24, wherein in the training execution step, computing the patch-wise loss by computing a weighted sum of the losses computed for each patch set, and wherein in the weighted sum, a value greater than a weight of the loss computed for the patch set including the first positive example patch extracted from outside the specific region is set to a weight of the loss computed for the patch set including the first positive example patch extracted from inside the specific region.

(Supplementary Note 26)

The computer-readable medium according to preliminary amendment 25, wherein the feature extraction model comprises a plurality of layers, wherein each of the layers generates a feature map of a smaller size than a feature map generated by a previous layer by extracting features from the feature map generated by the previous layer, wherein in the training execution step:

extracting the features corresponding to the first positive example patch and the features corresponding to the first negative example patch from each of the plurality of feature maps generated by the plurality of layers of the feature extraction model to which the training image is input;

extracting the features corresponding to the second positive example patch from each of the plurality of feature maps generated by the plurality of layers of the feature extraction model to which the output image is input;

computing a loss for each patch set and for each layer using the features of the first positive example patch, the first negative example patch, and the second positive example patch of that patch set extracted from the feature map generated by that layer; and computing the patch-wise loss by computing a weighted sum of the losses computed for each patch set and for each layer, and wherein in the weighted sum, the closer a size of a partial region of the input image corresponding to one cell of the feature map is to a size of the first positive example patch, the greater a weight of the loss computed using features extracted from that feature map is set to be.

(Supplementary Note 27)

The computer-readable medium according to preliminary amendment 25, wherein the feature extraction model comprises a plurality of layers, wherein each of the layers generates a feature map of a smaller size than a feature map generated by a previous layer by extracting features from the feature map generated by the previous layer, wherein in the training execution step:

extracting the features corresponding to the first positive example patch and the features corresponding to the first negative example patch from each of the plurality of feature maps generated by the plurality of layers of the feature extraction model to which the training image is input;

extracting the features corresponding to the second positive example patch from each of the plurality of feature maps generated by the plurality of layers of the feature extraction model to which the output image is input;

computing a loss for each patch set and for each layer using the features of the first positive example patch, the first negative example patch, and the second positive example patch of that patch set extracted from the feature map generated by that layer; and computing the patch-wise loss by computing a weighted sum of the losses computed for each patch set and for each layer, and wherein in the weighted sum, for the feature map in which a size of a partial region corresponding to one cell of the feature map is closest to a size of the first positive example patch, a greater weight is set for the loss computed using the features extracted from that feature map is set to be greater than those set for other losses.

REFERENCE SIGNS LIST

10 INPUT IMAGE
12 PARTIAL REGION
20 OUTPUT IMAGE
22 POSITIVE EXAMPLE PATCH
30 FIRST FEATURE MAP
40 SECOND FEATURE MAP
50 TRAINING IMAGE
52 POSITIVE EXAMPLE PATCH
54 NEGATIVE EXAMPLE PATCH
70 GENERATIVE ADVERSARIAL NETWORK
80 DISCRIMINATIVE MODEL
90 LABEL
100 IMAGE CONVERSION MODEL
110 FEATURE EXTRACTION MODEL
120 IMAGE GENERATION MODEL
200 FEATURE MAP
210 CELL
300 EXTRACTION PROBABILITY MAP
310 SPECIFIC REGION
500 COMPUTER
502 BUS
504 PROCESSOR
506 MEMORY
508 STORAGE DEVICE
510 INPUT/OUTPUT INTERFACE
512 NETWORK INTERFACE
2000 MODEL TRAINING APPARATUS
2020 ACQUISITION UNIT
2040 TRAINING EXECUTION UNIT

What is claimed is:

1. A model training apparatus comprising:
at least one memory that is configured to store instructions; and
at least one processor that is configured to execute the instructions to:
  acquire a training image, which is a first image used for a training of an image conversion model; and
  perform the training of the image conversion model to generate, from an input image representing a scene in a first environment, an output image representing the scene in a second environment,
wherein the image conversion model comprises a feature extraction neural network and an image generation neural network, the feature extraction neural network being configured to generate a feature map by extracting features from each of a plurality of partial regions of the input image, the image generation neural network being configured to generate the output image from the feature map generated by the feature extraction neural network,
wherein the training of the image conversion model further includes:
  acquiring a first feature map and the output image by inputting the training image to the image conversion model, the first feature map being a feature map of the training image;

acquiring a second feature map by inputting the output image to the feature extraction neural network, the second feature map being a feature map of the output image;
  generating one or more patch sets, each of which is a set of a first positive example patch, a first negative example patch, and a second positive example patch, the first positive example patch and the first negative example patch being partial regions of the training image, the second positive example patch being a partial region at a position corresponding to the first positive example patch in the output image; and
  performing a training of the image conversion model using a patch-wise loss that is computed using the first feature map, the second feature map, and the patch set,
wherein the generation of the patch set further includes extracting the first positive example patch intensively from a specific region representing an object of a specific type among regions included in the training image,
wherein the generation of the patch set further includes:
  generating an extraction probability map that represents an extraction probability for each of the plurality of partial regions of the training image, the extraction probability representing a probability that the partial region is extracted as the first positive example patch; and
  extracting the first positive example patch from the training image according to the extraction probability represented by the extraction probability map, and
wherein the generation of the extraction probability map further includes:
  setting, for each partial region in the extraction probability map, a higher extraction probability thereto as degree of overlap between that partial region and the specific region is higher;
  determining a subtype of the object represented by the specific region included in the training image, the subtype representing a finer classification than the specific type; and
  setting, for each partial region in the extraction probability map, a higher extraction probability thereto as degree of overlap between that partial region and the specific region is higher and as frequency of appearance of the subtype of the object represented by the specific region overlapping with that partial region is lower.

2. The model training apparatus according to claim 1, wherein the generation of the patch set further includes:
  determining whether to extract the first positive example patch from inside or outside the specific region so that a probability of the first positive example patch being extracted from inside the specific region is higher than a probability of the first positive example patch being extracted from outside the specific region; and
  extracting the first positive example patch from the training image based on a result of the determination.

3. The model training apparatus according to claim 1, wherein the patch-wise loss is computed so as to be smaller as similarity between features corresponding to the first positive example patch and features corresponding to the second positive example patch is higher, and so as to be greater as similarity between features corresponding to the first negative example patch and the features corresponding to the second positive example patch is lower.

4. A training method executed by a computer, the training method comprising:

acquiring a training image, which is a first image used for a training of an image conversion model; and performing the training of the image conversion model to generate, from an input image representing a scene in a first environment, an output image representing the scene in a second environment, wherein the image conversion model comprises a feature extraction neural network and an image generation neural network, the feature extraction neural network being configured to generate a feature map by extracting features from each of a plurality of partial regions of the input image, the image generation neural network being configured to generate the output image from the feature map generated by the feature extraction neural network, wherein the training of the image conversion model further includes:

acquiring a first feature map and the output image by inputting the training image to the image conversion model, the first feature map being a feature map of the training image;

acquiring a second feature map by inputting the output image to the feature extraction neural network, the second feature map being a feature map of the output image;

generating one or more patch sets, each of which is a set of a first positive example patch, a first negative example patch, and a second positive example patch, the first positive example patch and the first negative example patch being partial regions of the training image, the second positive example patch being a partial region at a position corresponding to the first positive example patch in the output image; and performing a training of the image conversion model using a patch-wise loss that is computed using the first feature map, the second feature map, and the patch set, wherein the generation of the patch set further includes:

extracting the first positive example patch intensively from a specific region representing an object of a specific type among regions included in the training image;

generating an extraction probability map that represents an extraction probability for each of the plurality of partial regions of the training image, the extraction probability representing a probability that the partial region is extracted as the first positive example patch; and extracting the first positive example patch from the training image according to the extraction probability represented by the extraction probability map, and wherein the generation of the extraction probability map further includes:

setting, for each partial region in the extraction probability map, a higher extraction probability thereto as degree of overlap between that partial region and the specific region is higher;

determining a subtype of the object represented by the specific region included in the training image, the subtype representing a finer classification than the specific type; and setting, for each partial region in the extraction probability map, a higher extraction probability thereto as degree of overlap between that partial region and the specific region is higher and as frequency of appearance of the subtype of the object represented by the specific region overlapping with that partial region is lower.

5. The model training method according to claim 4, wherein the generation of the patch set further includes:

determining whether to extract the first positive example patch from inside or outside the specific region so that a probability of the first positive example patch being extracted from inside the specific region is higher than a probability of the first positive example patch being extracted from outside the specific region; and extracting the first positive example patch from the training image based on the result of the determination.

6. The training method according to claim 4, wherein the patch-wise loss is computed so as to be smaller as similarity between features corresponding to the first positive example patch and features corresponding to the second positive example patch is higher, and so as to be greater as similarity between features corresponding to the first negative example patch and the features corresponding to the second positive example patch is lower.

7. A non-transitory computer-readable medium storing a program causing a computer to execute:

acquiring a training image, which is a first image used for a training of an image conversion model; and performing the training of the image conversion model to generate, from an input image representing a scene in a first environment, an output image representing the scene in a second environment, wherein the image conversion model comprises a feature extraction neural network and an image generation neural network, the feature extraction neural network being configured to generate a feature map by extracting features from each of a plurality of partial regions of the input image, the image generation neural network being configured to generate the output image from the feature map generated by the feature extraction neural network, wherein the training of the image conversion model further includes:

acquiring a first feature map and the output image by inputting the training image to the image conversion model, the first feature map being a feature map of the training image;

acquiring a second feature map by inputting the output image to the feature extraction neural network, the second feature map being a feature map of the output image;

generating one or more patch sets, each of which is a set of a first positive example patch, a first negative example patch, and a second positive example patch, the first positive example patch and the first negative example patch being partial regions of the training image, the second positive example patch being a partial region at a position corresponding to the first positive example patch in the output image; and performing a training of the image conversion model using a patch-wise loss that is computed using the first feature map, the second feature map, and the patch set, and wherein the generation of the patch set further includes:

extracting the first positive example patch intensively from a specific region representing an object of a specific type among regions included in the training image;

generating an extraction probability map that represents an extraction probability for each of the plurality of partial regions of the training image, the extraction probability representing a probability that the partial region is extracted as the first positive example patch; and extracting the first positive example patch from the training image according to the extraction probability represented by the extraction probability map, and wherein the generation of the extraction probability map further includes:

setting, for each partial region in the extraction probability map, a higher extraction probability thereto as degree of overlap between that partial region and the specific region is higher;

determining a subtype of the object represented by the specific region included in the training image, the subtype representing a finer classification than the specific type; and setting, for each partial region in the extraction probability map, a higher extraction probability thereto as degree of overlap between that partial region and the specific region and as frequency of appearance of the subtype of the object represented by the specific region overlapping with that partial region is lower.

8. The computer-readable medium according to claim 7, wherein the generation of the patch set further includes:

determining whether to extract the first positive example patch from inside or outside the specific region so that a probability of the first positive example patch being extracted from inside the specific region is higher than a probability of the first positive example patch being extracted from outside the specific region; and extracting the first positive example patch from the training image based on the result of the determination.

9. The computer-readable medium according to claim 7, wherein the patch-wise loss is computed so as to be smaller as similarity between features corresponding to the first positive example patch and features corresponding to the second positive example patch is higher, and so as to be higher as similarity between features corresponding to the first negative example patch and the features corresponding to the second positive example patch is lower.

*    *    *    *    *